(12) United States Patent
Kosenka et al.

(10) Patent No.: US 12,504,394 B2
(45) Date of Patent: Dec. 23, 2025

(54) COMBINED TRANSFER MODULE WITH INTEGRATED CONDUCTIVITY MEASUREMENT

(71) Applicant: BL Technologies, Inc., Minnetonka, MN (US)

(72) Inventors: Paul Kosenka, Boulder, CO (US); Krzysztof Franaszczuk, Boulder, CO (US); Bryan Schiffner, Boulder, CO (US); Paulus VanHoudt, Boulder, CO (US); Helen Prieto, Boulder, CO (US); Josh Engel, Boulder, CO (US)

(73) Assignee: BL Technologies, Inc.

( * ) Notice: Subject to any disclaimer, the term of this patent is extended or adjusted under 35 U.S.C. 154(b) by 119 days.

(21) Appl. No.: 18/035,717

(22) PCT Filed: Nov. 5, 2021

(86) PCT No.: PCT/US2021/058149
§ 371 (c)(1),
(2) Date: May 5, 2023

(87) PCT Pub. No.: WO2022/098928
PCT Pub. Date: May 12, 2022

(65) Prior Publication Data
US 2023/0408433 A1 Dec. 21, 2023

Related U.S. Application Data

(60) Provisional application No. 63/110,466, filed on Nov. 6, 2020.

(51) Int. Cl.
*G01N 27/07* (2006.01)
*G01N 33/18* (2006.01)

(52) U.S. Cl.
CPC ......... *G01N 27/07* (2013.01); *G01N 33/1846* (2013.01)

(58) Field of Classification Search
CPC ..................... G01N 33/1846; G01N 27/07
See application file for complete search history.

(56) References Cited

U.S. PATENT DOCUMENTS 5,132,094 A * 7/1992 Godec ................. G01N 31/005
422/68.1
5,413,763 A * 5/1995 Jeffers ................ G01N 33/1846
96/6

(Continued)

FOREIGN PATENT DOCUMENTS

JP 2008241325 A * 10/2008 ......... G01N 33/1846
JP 2013160611 A 8/2013

OTHER PUBLICATIONS

Iharada et al_JP-2008241325-A Machine translation_2008, pp. 1-10 (Year: 2008).*

(Continued)

*Primary Examiner* — Eman A Alkafawi
*Assistant Examiner* — Suresh K Rajaputra
(74) *Attorney, Agent, or Firm* — Meunier Carlin & Curfman LLC

(57) ABSTRACT

A device for analyzing total organic carbon (TOC) within a fluid at a desired temperature can include one or more transfer modules, each including a first and second transfer plate. A first fluid channel is formed in the first transfer plate and a second fluid channel is formed in the second transfer plate. A $CO_2$ permeable membrane is disposed between the first fluid channel and the second fluid channel and a temperature measurement device measures a temperature of a fluid within the first and/or second fluid channel. A temperature control system is configured to heat or cool the transfer plates. Heating or cooling the transfer plates heats or (Continued)

cools the fluid within the first and/or second fluid channel to the desired temperature. One or more conductivity sensors are configured to measure a conductivity of the fluid within the first and/or second fluid channel.

23 Claims, 29 Drawing Sheets

(56) References Cited

U.S. PATENT DOCUMENTS

| | | | | |
|---|---|---|---|---|
| 5,750,073 | A | * | 5/1998 | Godec ................ G01N 31/005 422/78 |
| 5,798,271 | A | * | 8/1998 | Godec ................ G01N 27/06 436/158 |
| 5,902,751 | A | | 5/1999 | Godec et al. |
| 9,176,106 | B2 | * | 11/2015 | Yahata ................ G01N 27/06 |
| 2008/0220533 | A1 | * | 9/2008 | Fujiyama ........... G01N 33/1846 422/82.02 |
| 2009/0004061 | A1 | * | 1/2009 | Fujiyama ........... G01N 33/1846 422/78 |
| 2012/0180554 | A1 | * | 7/2012 | Leggett ................ G01N 27/08 73/61.41 |
| 2020/0003747 | A1 | * | 1/2020 | Rajagopalan ...... G01N 33/1846 |

OTHER PUBLICATIONS

International Search Report and Written Opinion, dated Feb. 22, 2022, received in connection with corresponding International Patent Application No. PCT/US2021/058149.

International Preliminary Report on Patentability issued for Application PCT/US2021/058149, dated May 19, 2023.

Communication pursuant to Article 94(3) EPC in connection to EP Application No. 21 816 249.3, dated Jul. 29, 2024.

* cited by examiner

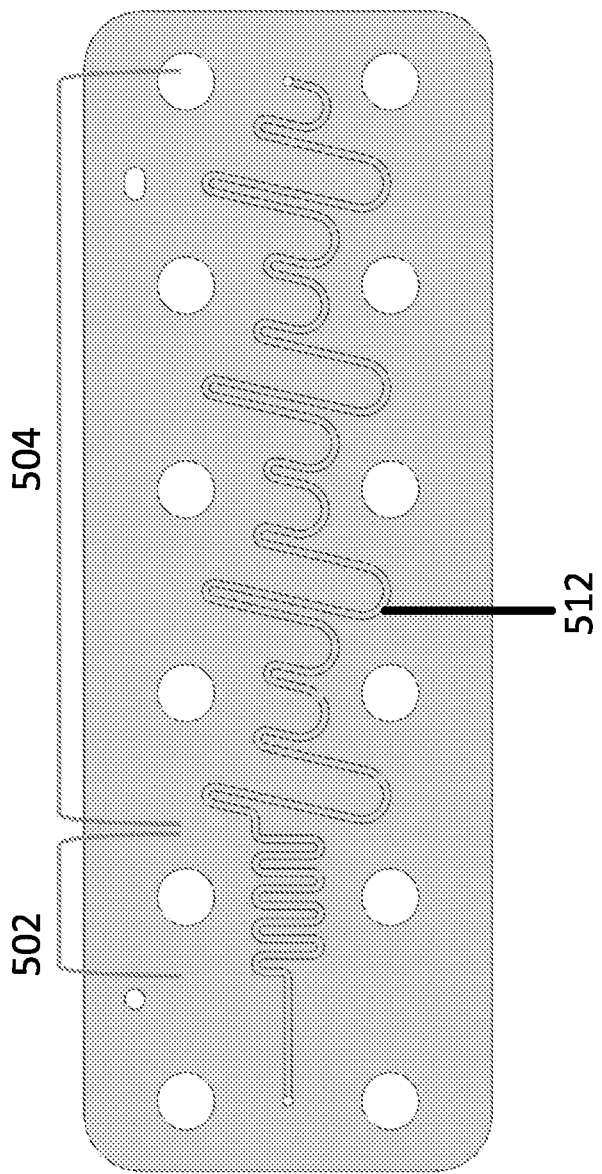
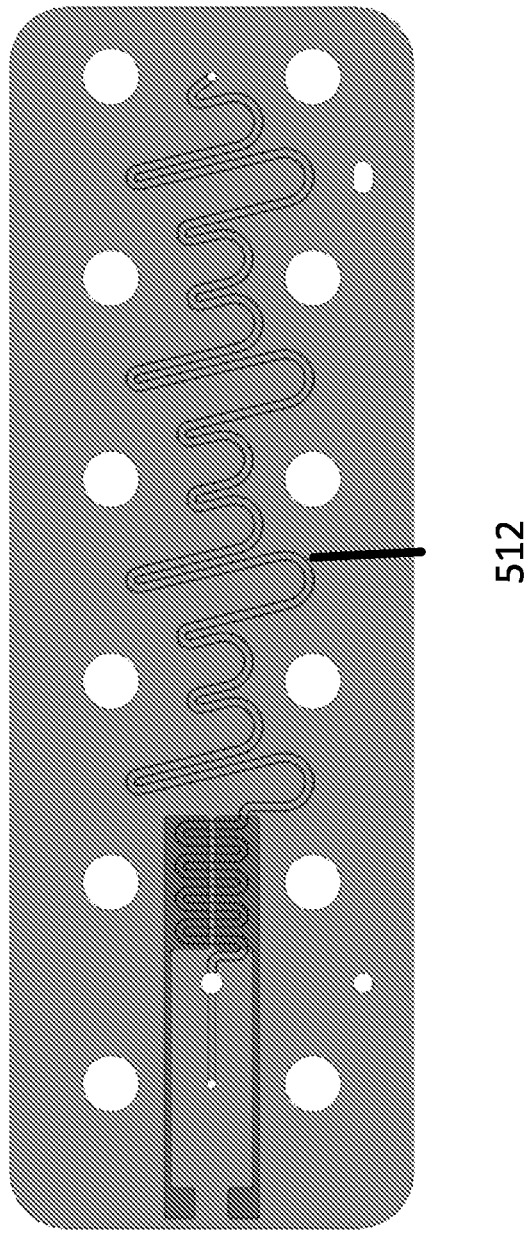
FIG. 6A
FIG. 6B

COMBINED TRANSFER MODULE WITH INTEGRATED CONDUCTIVITY MEASUREMENT

CROSS-REFERENCE TO RELATED PATENT APPLICATIONS

This application is a U.S. National Stage application filed under 35 U.S.C. § 371 of PCT/US2021/058149, filed Nov. 5, 2021, which claims the benefit of priority to U.S. Provisional Application No. 63/110,466, filed Nov. 6, 2020, each of which is hereby incorporated herein by reference in their entirety.

BACKGROUND

The present disclosure is generally related to systems, devices, and methods for estimating conductivity of a fluid at a desired temperature. Total organic carbon (TOC) analyzers are used for, among other purposes, cleaning validation of systems containing organic carbon. Descriptions of TOC analyzers can be found in U.S. Pat. Nos. 5,132,094 and 5,902,751, both of which are incorporated herein by reference in their entireties.

In some instances, conventional TOC analyzers may be used to determine the conductivity of aqueous solutions. The conductivity of an aqueous solution has a temperature dependence which varies depending on the concentration and composition of the ions present. For standardization purposes, conductivity values are often routinely reported at 25° C. but are rarely measured at that exact temperature. This can require the use of temperature compensation algorithms, requiring knowledge of the temperature and composition of the solution, to calculate the expected conductivity value at 25° C. In many industrial applications, the composition of the solution is unknown and assumptions about the chemical composition are required to approximate an expected value calculation to the 25° C. standard. Further, some conductivity meters require the use of multiple conductivity cells to measure separate streams, resulting in bulky devices, and allowing for the potential to obtain different conductivity values for the same solution from each cell.

Thus, a need exists for a devices and systems that do not rely on a temperature compensation calculation, and instead control the solution temperature to a specified reference temperature to obtain a direct conductivity measurement.

SUMMARY

One implementation of the present disclosure is a device for measuring conductivity of a fluid at a desired temperature. The device includes one or more transfer modules, each transfer module including a first transfer plate, the first transfer plate having a first side and a second side, wherein a first fluid channel is formed in the first side of the first transfer plate, a second transfer plate, the second transfer plate having a first side and a second side, wherein a second fluid channel is formed in the first side of the second transfer plate, wherein the first side of the first transfer plate faces the first side of the second transfer plate, and a gas permeable membrane disposed between the first transfer plate and the second transfer plate, wherein a portion of the first fluid channel and a portion of the second fluid channel are separated by the gas permeable membrane. The device also includes one or more temperature measurement devices configured to measure a temperature of a fluid within the first fluid channel and/or a temperature of a fluid within the second fluid channel, a temperature control system configured to heat or cool at least one or both of the first transfer plate and the second transfer plate of each of the one or more transfer modules, wherein heating or cooling the at least one or both of the first transfer plate and the second transfer plate heats or cools the fluid within the first fluid channel and/or the fluid within the second fluid channel to the desired temperature, and one or more conductivity sensors configured to measure a conductivity of the fluid within the portion of the first fluid channel separated from the second fluid channel by the gas permeable membrane at the desired temperature and/or a conductivity of the fluid within the portion of the second fluid channel separated from the first fluid channel by the gas permeable membrane at the desired temperature.

In some embodiments, the device includes a plurality of transfer modules.

In some embodiments, for each transfer module, the second side of the first transfer plate is attached to a first clamp plate and the second side of the second transfer plate is attached to a second clamp plate.

In some embodiments, the temperature control system is further configured to heat or cool at least one of the first clamp plate and the second clamp plate.

In some embodiments, for at least one of the one or more transfer modules, the first transfer plate, the second transfer plate, and the gas permeable membrane are at least partially within an enclosure.

In some embodiments, the enclosure is insulated.

In some embodiments, the temperature control system includes one or more solid state heat pumps.

In some embodiments, a heatsink is configured to cool the one or more solid state heat pumps.

In some embodiments, a fan is configured to cool the heatsink.

In some embodiments, the one or more solid state heat pumps are configured to maintain the one or more transfer modules at the desired temperature based on at least the one or more temperature measurement devices.

In some embodiments, the one or more solid state heat pumps include one or more thermoelectric coolers.

In some embodiments, the one or more thermoelectric coolers include one or more Peltier effect coolers.

In some embodiments, the temperature control system is controlled based on the temperature measured by the one or more temperature measurement devices of the fluid within the first fluid channel and/or the temperature of the fluid within the second fluid channel.

In some embodiments, the one or more temperature measurement devices include one or more thermistors.

In some embodiments, the first or second fluid channel is a serpentine fluid channel.

In some embodiments, the one or more conductivity sensors are comprised of interdigitated electrodes.

In some embodiments, at least one of the fluid within the first fluid channel or the fluid within the second fluid channel includes at least a portion of a fluid sample.

In some embodiments, at least one of the fluid within the first fluid channel or the fluid within the second fluid channel includes at least a portion of the fluid sample treated with a reagent.

In some embodiments, at least one of the fluid within the first fluid channel or the fluid within the second fluid channel includes deionized water.

In some embodiments, the gas permeable membrane includes a $CO_2$ permeable membrane.

In some embodiments, the measured conductivity of the fluid within the portion of the first fluid channel separated from the second fluid channel by the gas permeable membrane measured at the desired temperature and/or the conductivity of the fluid within the portion of the second fluid channel separated from the first fluid channel by the gas permeable membrane measured at the desired temperature are used to determine total organic carbon (TOC) of the fluid sample.

In some embodiments, the device further includes a third channel, wherein a fluid in the third channel includes an unaltered portion of the fluid sample, and wherein the temperature control system changes the temperature of the unaltered portion of the fluid sample to the desired temperature and the one or more conductivity sensors measures a conductivity of the unaltered portion of the fluid sample at the desired temperature.

In some embodiments, the measured conductivity of the fluid within the portion of the first fluid channel separated from the second fluid channel by the gas permeable membrane measured at the desired temperature and/or the conductivity of the fluid within the portion of the second fluid channel separated from the first fluid channel by the gas permeable membrane measured at the desired temperature and/or the measured conductivity of the unaltered portion of the fluid sample at the desired temperature is used to determine total organic carbon (TOC) of the fluid sample.

In some embodiments, the desired temperature is 25° C.

Another implementation of the present disclosure is a system for analyzing total organic carbon (TOC) within a fluid at a desired temperature. The system includes one or more transfer modules, each transfer module including a first transfer plate, the first transfer plate having a first side and a second side, wherein a first fluid channel is formed in the first side of the first transfer plate, a second transfer plate, the second transfer plate having a first side and a second side, wherein a second fluid channel is formed in the first side of the second transfer plate, wherein the first side of the first transfer plate faces the first side of the second transfer plate, and a $CO_2$ permeable membrane disposed between the first transfer plate and the second transfer plate, wherein a portion of the first fluid channel and a portion of the second fluid channel are separated by the $CO_2$ permeable membrane. The device also includes one or more temperature measurement devices configured to measure a temperature of a fluid within the first fluid channel and/or a temperature of a fluid within the second fluid channel, a temperature control system configured to heat or cool at least one or both of the first transfer plate and the second transfer plate of each of the one or more transfer modules, wherein heating or cooling the at least one or both of the first transfer plate and the second transfer plate heats or cools the fluid within the first fluid channel and/or the fluid within the second fluid channel to the desired temperature, and one or more conductivity sensors configured to measure a conductivity of the fluid within the portion of the first fluid channel separated from the second fluid channel by the $CO_2$ permeable membrane and/or a conductivity of the fluid within the portion of the second fluid channel separated from the first fluid channel by the $CO_2$ permeable membrane.

In some embodiments, the system includes a plurality of transfer modules.

In some embodiments, for each transfer module, the second side of the first transfer plate is attached to a first clamp plate and the second side of the second transfer plate is attached to a second clamp plate.

In some embodiments, the temperature control system is further configured to heat or cool at least one of the first clamp plate and the second clamp plate.

In some embodiments, for at least one of the one or more transfer modules, the first transfer plate, the second transfer plate, and the $CO_2$ permeable membrane are at least partially within an enclosure.

In some embodiments, the enclosure is insulated.

In some embodiments, the temperature control system includes one or more solid state heat pumps.

In some embodiments, a heatsink is configured to cool the one or more solid state heat pumps.

In some embodiments, a fan is configured to cool the heatsink.

In some embodiments, the one or more solid state heat pumps are configured to maintain the one or more transfer modules at the desired temperature based on at least the one or more temperature measurement devices.

In some embodiments, the one or more solid state heat pumps include one or more thermoelectric coolers.

In some embodiments, the temperature control system is controlled based on the temperature measured by the one or more temperature measurement devices of the fluid within the first fluid channel and/or the temperature of the fluid within the second fluid channel.

In some embodiments, the one or more temperature measurement devices include one or more thermistors.

In some embodiments, the first or second fluid channel is a serpentine fluid channel.

In some embodiments, the one or more conductivity sensors are comprised of interdigitated electrodes.

In some embodiments, the desired temperature is 25° C.

Yet another implementation of the present disclosure is a method for analyzing total organic carbon (TOC) within a fluid at a desired temperature. The method includes providing one or more transfer modules, each transfer module including a first transfer plate, the first transfer plate having a first side and a second side, wherein a first fluid channel is formed in the first side of the first transfer plate, a second transfer plate, the second transfer plate having a first side and a second side, wherein a second fluid channel is formed in the first side of the second transfer plate, wherein the first side of the first transfer plate faces the first side of the second transfer plate, and a $CO_2$ permeable membrane disposed between the first transfer plate and the second transfer plate, wherein a portion of the first fluid channel and a portion of the second fluid channel are separated by the $CO_2$ permeable membrane. The method also includes measuring a temperature of the fluid within the first fluid channel and/or a temperature of the fluid within the second fluid channel with one or more temperature measurement devices configured to measure the temperature of the fluid within the first fluid channel and/or the temperature of the fluid within the second fluid channel, heating or cooling a fluid within the first fluid channel and/or a fluid within the second fluid channel to the desired temperature by providing a temperature control system configured to heat or cool at least one or both of the first transfer plate and the second transfer plate of each transfer module, wherein heating or cooling the at least one or both of the first transfer plate and the second transfer plate heats or cools a fluid within the first fluid channel and/or a fluid within the second fluid channel to the desired temperature, and measuring a conductivity of the fluid within the portion of the first fluid channel separated from the second fluid channel by the $CO_2$ permeable membrane and/or a conductivity of the fluid within the portion of the second fluid channel separated from the first fluid channel by the $CO_2$ permeable membrane using one or more conductivity sensors configured to measure the conductivity of the fluid within the first fluid channel and/or the conductivity of the fluid within the second fluid channel.

In some embodiments, the method includes providing a plurality of transfer modules.

In some embodiments, for each transfer module the second side of the first transfer plate is attached to a first clamp plate and the second side of the second transfer plate is attached to a second clamp plate.

In some embodiments, the temperature control system is further configured to heat or cool at least one of the first clamp plate and the second clamp plate.

In some embodiments, for at least one of the one or more transfer modules, the first transfer plate, the second transfer plate, and the $CO_2$ permeable membrane are at least partially within an enclosure.

In some embodiments, the enclosure is insulated.

In some embodiments, the temperature control system includes one or more solid state heat pumps.

In some embodiments, a heatsink is configured to cool the one or more solid state heat pumps.

In some embodiments, a fan is configured to cool the heatsink.

In some embodiments, the one or more solid state heat pumps are configured to maintain the one or more transfer modules at the desired temperature based on at least the one or more temperature measurement devices.

In some embodiments, the one or more solid state heat pumps include one or more thermoelectric coolers.

In some embodiments, the temperature control system is controlled based on the temperature measured by the one or more temperature measurement devices of the fluid within the first fluid channel and/or the temperature of the fluid within the second fluid channel.

In some embodiments, the one or more temperature measurement devices include one or more thermistors.

In some embodiments, the first or second fluid channel is a serpentine fluid channel.

In some embodiments, the one or more conductivity sensors are comprised of interdigitated electrodes.

In some embodiments, the desired temperature is 25° C.

Yet another implementation of the present disclosure is a method for determining conductivity of a fluid at a desired temperature. The method includes providing a temperature control system that controls a temperature of the fluid within the temperature-controlled environment, receiving the fluid into the temperature-controlled environment and changing a temperature of the received fluid to a desired temperature using the temperature control system, and measuring a conductivity of the fluid at the desired temperature using the conductivity sensor.

In some embodiments, the measured conductivity of the fluid at the desired temperature is used in determining a total organic carbon concentration of the fluid.

In some embodiments, determining the total organic carbon concentration of the fluid includes processing the fluid so that the conductivity of the fluid is proportional to the total organic carbon concentration of the fluid.

In some embodiments, determining the total organic carbon concentration of the fluid is based on only the conductivity of the fluid and a known constant that relates the conductivity of organic carbon at the specified temperature to the concentration of organic carbon at the specified temperature.

In some embodiments, the steps of measuring the conductivity of the fluid and determining the total organic carbon concentration of the fluid are performed in less than 15 seconds.

In some embodiments, the conductivity sensor is comprised of interdigitated electrodes.

In some embodiments, the desired temperature is 25° C.

Yet another implementation of the present disclosure is a method for analyzing total organic carbon (TOC) within a fluid. The method includes providing a temperature-controlled environment, a first conductivity sensor, and a second conductivity sensor, providing a first sample of the fluid wherein the first sample of the fluid includes a concentration of inorganic carbon proportional to the inorganic carbon concentration of the fluid, providing a second sample of the fluid wherein the second sample of the fluid includes a concentration of total carbon proportional to the total carbon concentration of the fluid, measuring the conductivity of the first sample using the first conductivity sensor, measuring the conductivity of the second sample using the second conductivity sensor, determining the total organic carbon of the fluid based on the conductivity of the first sample and the conductivity of the second sample.

Yet another implementation of the present disclosure is a method for analyzing total organic carbon (TOC) within a fluid. The method includes providing a thermally controlled environment, a first conductivity sensor, a second conductivity sensor, a first sample of the fluid, and a second sample of the fluid, measuring the conductivity of the first sample of the fluid with the first conductivity sensor, measuring the conductivity of the second sample of the fluid with the second conductivity sensor, determining the total organic carbon concentration of the fluid based on the conductivity of the first sample and the conductivity of the second sample.

In some embodiments, the method further includes processing the first sample with a reagent so that the first sample represents the total inorganic carbon of the fluid.

In some embodiments, the method further includes oxidizing the second sample so that the second sample represents the total carbon of the fluid.

In some embodiments, the steps of measuring the conductivity of the first sample, measuring the conductivity of the second sample, and determining the total organic carbon concentration of the fluid are performed in less than 15 seconds.

In some embodiments, the thermally controlled environment is 25° C.

Yet another implementation of the present disclosure is a method of measuring the conductivity of a fluid at a specified temperature. The method includes providing a conductivity cell, and a thermally controlled environment, wherein the conductivity cell is at least partially inside the thermally controlled environment, passing the fluid through the conductivity cell, measuring the conductivity of the fluid using the conductivity cell.

In some embodiments, the conductivity cell includes interdigitated electrodes.

In some embodiments, the conductivity measurement is performed while the fluid flows through the conductivity cell.

In some embodiments, the fluid passes through a serpentine before entering the conductivity cell.

In some embodiments, the serpentine is formed in a transfer plate.

In some embodiments, the thermally controlled environment is controlled based on a thermistor configured to measure the temperature of the fluid and/or the conductivity cell.

In some embodiments, the thermally controlled environment includes a transfer plate and a solid-state heat pump configured to control the temperature of the transfer plate.

In some embodiments, the steps of passing the fluid through the conductivity cell and measuring the conductivity of the fluid are performed in 100 milliseconds seconds or less.

In some embodiments, the steps of passing the fluid through the conductivity cell and measuring the conductivity of the fluid are performed in 100 msec or less.

Yet another implementation of the present disclosure is a device for measuring the conductivity of a fluid at a specified temperature. The device includes a thermally controlled environment,
- a fluid channel placed inside the thermally controlled environment, and a conductivity cell placed inside the thermally controlled environment, wherein the fluid flows through the fluid channel and through the conductivity cell.

In some embodiments, the fluid channel is a serpentine fluid channel.

In some embodiments, the conductivity cell includes a plurality of interdigitated electrodes.

In some embodiments, the thermally controlled environment includes a transfer plate, and a temperature control system.

In some embodiments, the fluid channel is formed within the transfer plate.

In some embodiments, the temperature control system includes a heat pump.

In some embodiments, the heat pump is a solid-state heat pump.

In some embodiments, the thermally controlled environment includes one or more transfer modules, each transfer module including a first transfer plate, the first transfer plate having a first side and a second side, wherein a first fluid channel is formed in the first side of the first transfer plate, a second transfer plate, the second transfer plate having a first side and a second side, wherein a second fluid channel is formed in the first side of the second transfer plate, wherein the first side of the first transfer plate faces the first side of the second transfer plate, and
- one or more temperature measurement devices configured to measure a temperature of a fluid within the first fluid channel and/or a temperature of a fluid within the second fluid channel, a temperature control system configured to heat or cool at least one or both of the first transfer plate and the second transfer plate of each of the one or more transfer modules, wherein heating or cooling the at least one or both of the first transfer plate and the second transfer plate heats or cools the fluid within the first fluid channel and/or the fluid within the second fluid channel to the desired temperature, and one or more conductivity sensors configured to measure a conductivity of the fluid within at least a portion of the first fluid channel and/or a conductivity of the fluid within at least a portion of the second fluid channel at the desired temperature.

In some embodiments, at least one of the one or more transfer modules further includes a gas permeable membrane disposed between the first transfer plate and the second transfer plate, wherein a portion of the first fluid channel and a portion of the second fluid channel are separated by the gas permeable membrane, wherein the one or more conductivity sensors are configured to measure the conductivity of the fluid within the portion of the first fluid channel separated from the second fluid channel by the gas permeable membrane at the desired temperature and/or the conductivity of the fluid within the portion of the second fluid channel separated from the first fluid channel by the gas permeable membrane at the desired temperature.

In some embodiments, the temperature control system includes one or more heat pumps.

In some embodiments, each of the one or more heat pumps is a solid-state heat pump.

In some embodiments, each solid-state heat pump is a thermoelectric cooler.

In some embodiments, each thermoelectric cooler is a Peltier effect cooler.

Yet another implementation of the present disclosure is a device for measuring the kinetic conductivity of a flowing fluid. The device includes a first fluid channel, a second fluid channel disposed parallel to the first fluid channel, wherein fluid flows through an interior surface of the second fluid channel, a membrane separating the first fluid channel from the second fluid channel, and a plurality of electrodes positioned along the interior surface of the second fluid channel, wherein the plurality of electrodes are spaced along the direction of fluid flow and contact the flowing fluid, wherein a measurement of the kinetic conductivity of the flowing fluid can be measured by energizing the plurality of electrodes.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF DRAWINGS

Example features and implementations are disclosed in the accompanying drawings. However, the present disclosure is not limited to the precise arrangements and instrumentalities shown.

FIG. 4A shows a perspective view of a conductivity cell including two heat sinks. FIG. 4B shows a side view of a transfer module cell including two heat sinks.

FIGS. 6A-6B show views of the surface of a transfer plate including flow channels according to one implementation. FIG. 6A shows one configuration of flow channel, and FIG. 6B shows another configuration of flow channel.

FIG. 8A shows a view of a side of an enclosure with six input or output ports; FIG. 8B shows a view of a side of an enclosure with four input or output ports.

FIG. 12A shows a perspective view of a transfer module, FIG. 12B shows an illustration of a cross section of a transfer module including thermistors, and FIG. 12C shows an illustration of a top view of a transfer module.

DETAILED DESCRIPTION

Figure 1:
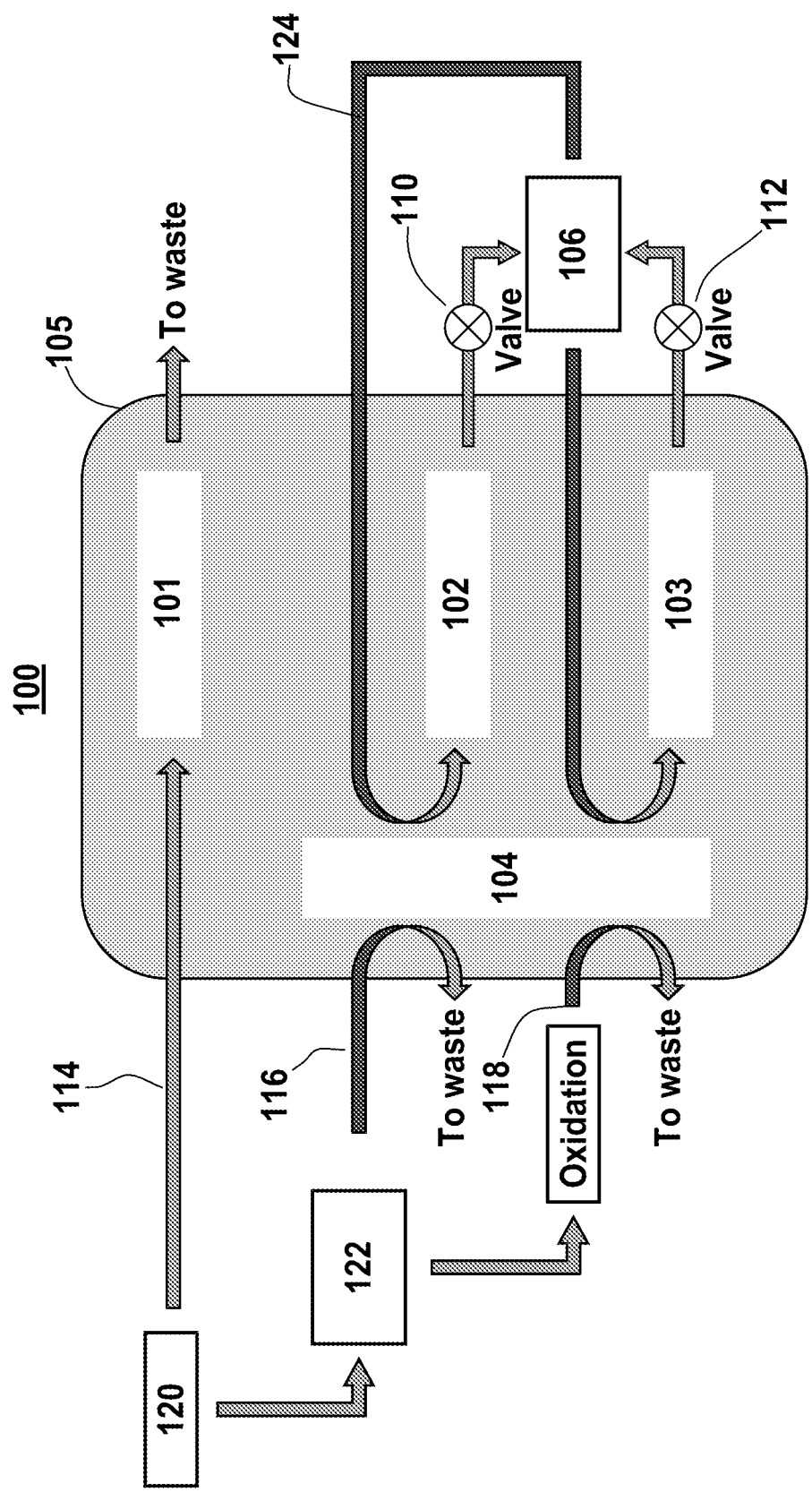
FIG. 1 shows block diagram of a combined transfer module including three conductivity cells, according to one implementation.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The devices and methods disclosed herein provide for a combined transfer module for a total organic carbon (TOC) analyzer. TOC analyzers can monitor water quality (e.g. purity). The results can be reported in the form of three parameters: sample specific conductivity at 25° C., concentration of inorganic carbon containing species, and concentration of organic carbon containing species. Conductivity can represent all ionic contents of a sample, inorganic carbon represents carbon dioxide ($CO_2$), and organic carbon represents all organic contaminants in a sample. Knowing all three parameters can allow users to tailor their water cleaning procedures to specific contaminants or groups of contaminants.

Throughout the present disclosure the terms "thermoelectric cooler", "Peltier module", "TEC", and "Peltier effect cooler" may be used interchangeably to refer to solid state heat pumps. It should be understood that the use of other heating/cooling devices as part of a temperature control system is contemplated by the present disclosure.

In some implementations it can desirable to report conductivity measures at a desired temperature. For example, in some applications it is desirable to report the conductivity of a sample at 25° C. However, the sample temperature may not be 25° C. Therefore, to report conductivity measurements at the desired temperature the conductivity cell can be equipped with thermocouple that provides a signal that corresponds to sample temperature. Using the sample temperature and sample conductivity, and the known conductivity cell geometry (i.e. the cell constant), sample specific conductivity at the desired temperature (e.g. 25° C.) is calculated. However, this calculation is based on an assumption of the sample water contents. In some implementations, this assumption can be standardized to common salts (e.g. NaCl) or acids (e.g. HCl or $H_2CO_3$). According to implementations described herein, a compact device can simultaneously and directly measure the conductivity of multiple fluids at the desired temperature (e.g., the standard reference temperature of 25° C., or other desired temperature), eliminating the need to utilize a temperature compensation algorithm.

FIG. 1 shows a block diagram of a device comprising a temperature-controlled combined transfer module 100 configured to operate as part of a Total Organic Carbon (TOC)

analyzer (not shown). Implementations of the temperature-controlled combined transfer module 100 can perform indirect measurements of TOC carbon and other water quality parameters using a $CO_2$ permeable membrane 104, conductivity sensor (not shown), temperature measurement device (not shown), and a temperature-controlled enclosure (105). Measurements using the temperature-controlled combined transfer module 100 can be indirect.

In a TOC analyzer application, thru-hole perforations in the carbon dioxide permeable membrane 104 can be used to maintain the fluid paths within the envelope of a temperature-controlled combined transfer module 100.

TOC analyzers can perform water quality measurements by manipulating water samples and using the properties of water to calculate relevant parameters. For example, the water specific conductivity at instrument temperature can be measured to provide basis to calculate required values. Specific conductivity is an electrical property of matter. For liquids, specific conductivity relates to ion concentration (analogous to electron concentration in metals) and ion mobility. Ion mobility is ion type dependent, as well as temperature dependent.

Referring again to FIG. 1, implementations described herein include one or more temperature-controlled conductivity cells 101, 102, 103. By performing conductivity measurements at a desired temperature, the need to use an assumption to standardize the conductivity measurement is eliminated. For example, the desired temperature can be an industry standard temperature (e.g. 25° C.). By measuring conductivity of the sample at the desired temperature, the conductivity of the sample at that desired temperature can be reported without performing a calculation based on an assumption of the sample water contents.

Again, referring to FIG. 1, implementations described herein can be configured to perform measurements of inorganic carbon concentration at a controlled temperature. Input streams to the temperature-controlled combined transfer module 100 include the sample 120, reagents 122, and deionized water 124. A stream of deionized water (DI) 124 circulates in closed loop with ion trap 106. The loop can divert into two parallel flow channels 110, 112 facing the $CO_2$ permeable membrane 104. A sample's acidity (pH) can be lowered by addition of a reagent (e.g. strong acid) 122. One input stream 116 can include a portion of the sample 120 to which the reagents 122 have been added. The equilibrium of carbonic acid in sample water ($H_2CO_3$) can be stoichiometrically shifted towards molecular $CO_2$. The sample containing reagents flows through fluid channels 116, 118 matching one of the fluid channels 110, 112 containing DI water, but on the opposing side of $CO_2$ permeable membrane 104. A portion of the unaltered sample stream 114 also can also pass through a conductivity cell 101 where conductivity can be measured in the temperature-controlled enclosure 105 at the desired temperature. For streams 116 and 118, $CO_2$ migrates through the membrane 104 towards equilibrium. Conductivity cells 102, 103 located downstream from the membrane 104 on DI water channels 110 112 measure conductivity in the temperature-controlled enclosure 105 at the desired temperature. In similar manner to the unaltered sample 114 conductivity measurement, specific conductivity of streams 116, 118 at the actual desired temperature (e.g., 25° C.) is measured. This measurement can be performed without using a calculation involving an assumption of the water contents, as the ion content of water can be exclusively derived from $CO_2$. However, some assumptions are applied for modeling temperature dependence of kinetics of $CO_2$ permeation through the membrane 104. Specific conductivity is then recalculated to carbon concentration. This concentration represents inorganic content of the sample.

Referring still to FIG. 1, implementations described herein can be used to measure organic carbon concentration at a controlled temperature. The sample water 120 can be fully oxidized, therefore its organic content is converted to carbon dioxide ($CO_2$). This can be performed using multiple techniques. Non-limiting examples of techniques to oxidize the sample include dosing the sample with chemical oxidizer (in addition to adding acid) and exposing the sample to short wave UV radiation. The oxidized sample flows through channel 118 on side of $CO_2$ permeable membrane facing second channel 112 of DI loop. A third conductivity measurement can be obtained at the desired temperature (e.g., 25° C.). As for inorganic carbon, similar measurements are performed. The resultant carbon concentration represents total carbon content of the sample. "Resultant carbon" is the "total carbon" (TC). Stream 118 has all carbon content of the sample in the form of equilibrated $CO_2$ (oxidation converts organic carbon to $CO_2$ and is added to existing inorganic carbon content). Acidification pushes $CO_2$ through membrane, so in stream 103 TC is being measured. Stream 102 measures only carbon originated from inorganic form of carbon in stream 116 (IC). Organic carbon concentration can be obtained by subtracting inorganic carbon concentration (TOC=TC−IC).

Implementations described herein can implement modular systems for measuring multiple sample properties. With reference to FIG. 1, a non-limiting example of a modular total organic carbon analyzer is shown that has three conductivity cells 101, 102, and 103. With reference to FIG. 1, the first conductivity cell 101 can be configured so that sample water passes directly through the conductivity cell 101 without being processed, and without passing through any membrane. Therefore, the conductivity cell 101 can be a conductivity cell that only includes one serpentine fluid channel 114 and is used to measure conductivity at the desired temperature in the temperature-controlled enclosure 105. Passing the fluid through the conductivity cell and measuring the conductivity of the fluid at the desired temperature can be performed very rapidly. For example, the fluid can be regulated to the desired temperature as it passes through the conductivity cell and the conductivity measured in 100 msec, or less. The second conductivity cell 102 can be configured to measure total inorganic carbon of a sample at the desired temperature in the temperature-controlled enclosure 105, and the second conductivity cell 102 may comprise two serpentine channels (one fluid channel 116 for the sample that has been treated with reagents 122, one for deionized water 124). Finally, the third conductivity cell 103 can be configured to measure total carbon at the desired temperature in the temperature-controlled enclosure 105. The TOC of a sample can therefore be determined by subtracting the total inorganic carbon measured in the second conductivity cell 102 at the desired temperature in the temperature-controlled enclosure 105 from total carbon measured in the third conductivity cell 103 at the desired temperature in the temperature-controlled enclosure 105. This third conductivity cell 103 can include a fluid channel 118 for the oxidized sample water, and another fluid channel for deionized water 124. Because the conductivity cells 101, 102, 103 can be constructed as separate modules, it is possible to add or remove cells to construct temperature-controlled combined transfer modules 100 that can measure different properties or different numbers of properties than have been described with reference to FIG. 1 at the desired temperature.

In some implementations, the conductivity cells 101, 102, 103 can include "interdigitated electrodes." Interdigitated electrodes are arrays of electrodes that are isolated from the other electrodes by sections of insulating material. The interdigitated electrodes can be configured as a conductivity sensor that measures the conductivity of the sample at the desired temperature in the temperature-controlled enclosure 105 as it flows through the conductivity cell 101, 102, 103. In implementations using interdigitated electrodes, the interdigitated electrodes can provide inherent signal amplification. Different materials can be used to construct the conductivity cell 101, 102, 103. As a non-limiting example, the conductivity cell 101 102 103 can be formed in a transfer plate formed mostly or completely of plastic (e.g. PCTFE), while the interdigitated electrodes can be made of gold. Further, the electrodes can be arranged in different configurations around the fluid stream. Non-limiting examples of electrode configurations include interdigitating the electrodes along the path of the stream and interdigitating the electrodes around the stream (i.e. such that electrodes are on opposite sides of the fluid channel). In some implementations the conductivity measurement is taken via a conductivity sensor located on the opposite side of the fluid channel from the membrane 104 at the desired temperature in the temperature-controlled enclosure 105. For example, interdigitated electrodes can be positioned opposite the membrane 104.

Implementations of the present disclosure may be used as part of a commercial TOC analyzer. Different numbers and configurations of fluid channel are contemplated as part of the temperature-controlled combined transfer module 100. As a non-limiting example, the combined transfer module may include four fluid channels, where one fluid channel contains deionized water, one fluid channel contains a sample of water used to measure total carbon, another fluid channel contains unmanipulated sample water, and another stream contains a sample of water used to measure inorganic carbon. Different numbers and combinations of fluid channels are contemplated.

In some implementations, the device accepts four fluid streams, where each fluid stream flows through a fluid channel DI water, IC (Total Inorganic carbon), TC (Total carbon), and raw sample water, for the purpose of simultaneously and directly measuring the conductivity of IC, TC, and raw sample fluid at a desired temperature (e.g., the reference temperature of 25° C., though other temperatures are contemplated within the scope of this disclosure). The temperature control system can include a thermoelectric cooler (e.g. a Peltier effect cooler) that is utilized to bring all four streams to the desired temperature. The fluid streams are passed from the temperature stabilization path to the measurement path through the thickness of the temperature-controlled combined transfer module 100. In some instances, the measurement paths are maintained at the desired temperature (e.g., 25° C.) using a second thermoelectric module. Membrane selective permeation property is utilized to transfer carbon dioxide from the IC and TC streams, into the DI water streams at the desired temperature; as such, a carbon dioxide permeable membrane 104 separates the DI water streams from the IC and TC streams. Thru-hole perforations in the carbon dioxide permeable membrane 104 can be used to direct the IC and TC streams from the measurement manifold to the opposing side of the membrane 104 in order to mirror the DI water paths. Interdigitated electrodes, embedded in the manifold at the ionic species transfer point, allow precise measurements of the small impedance in the environment between two metal plates separated by the DI fluid streams and the raw sample stream at the desired temperature.

Implementations described herein can allow for accurate conductivity measurement requiring no temperature compensation calculations to a desired temperature (e.g., 25° C.) and/or simplified construction of conductivity measurement apparatus in comparison to some conductivity measurement devices. Additionally, measurement of multiple streams within a single module can reduce measurement error due to manufacturing variations in comparison to some conductivity measuring devices.

In some implementations, the measurement device may be housed in an enclosure environmentally controlled to the desired temperature, instead or in addition to directly controlling stream temperature. Other implementations of a temperature-controlled membrane conductometric measurement apparatus may avoid perforating through a carbon dioxide permeable membrane 104 by utilizing multiple fluidic manifolds or passing the stream in and out of the manifold in multiple instances. In these implementations, additional temperature control can be used in the environment outside of the manifold to maintain the desired temperature.

Heating or cooling the temperature-controlled combined transfer module 100 may be performed according to some implementations. Heating and/or cooling modules can be attached to one or both sides of the temperature-controlled combined transfer module 100 (e.g. the sample side and the DI side). According to some implementations, one heater/cooler is configured to stabilize the temperature of sample water, while another heater/cooler is configured to stabilize the temperature of the deionized water.

A non-limiting example of a cooling module that may be part of a temperature control system is a Peltier effect cooler, which may include a heat sink and/or fan. The heating or cooling module may include sensors (e.g. thermistors) and a control circuit configured to keep the temperature of the temperature-controlled combined transfer module 100 within a specified tolerance. The control circuit can control the heating or cooling module based on the sensor outputs. For example, if the sensor determines that the temperature of the temperature-controlled combined transfer module 100 (i.e., the clamp plate or the transfer plate) is greater than desired, the control circuit can activate a cooling module. As a non-limiting example, the temperature-controlled combined transfer module 100 can be kept within 0.1° C. of a target temperature of 25° C., however different levels of tolerance and different target temperatures are contemplated.

Figure 2:
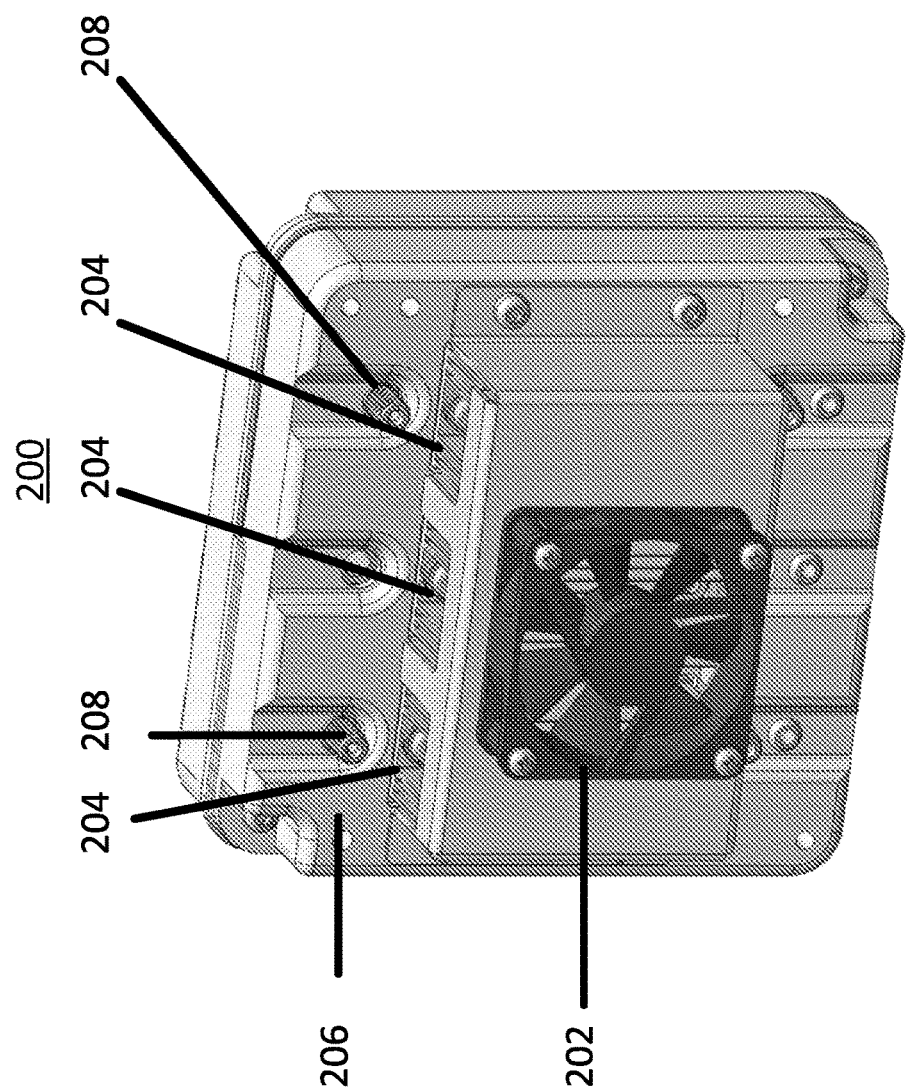
FIG. 2 shows a perspective view of a partially disassembled combined transfer module, according to one implementation.

Different numbers of transfer modules conductivity cells 101, 102, 103 and transfer modules can be combined into a combined transfer module 200, as shown in FIG. 2. One or more fans 202 and heat sinks 204 are configured to cool one or more thermoelectric coolers (not shown). The combined transfer module 200 can include a temperature-controlled (e.g., insulated) enclosure 206 that surrounds one or more individual transfer modules (not shown). The enclosure 206 can include one or more ports 208 configured to allow fluids to flow in or out of the combined transfer module 200.

Figure 3:
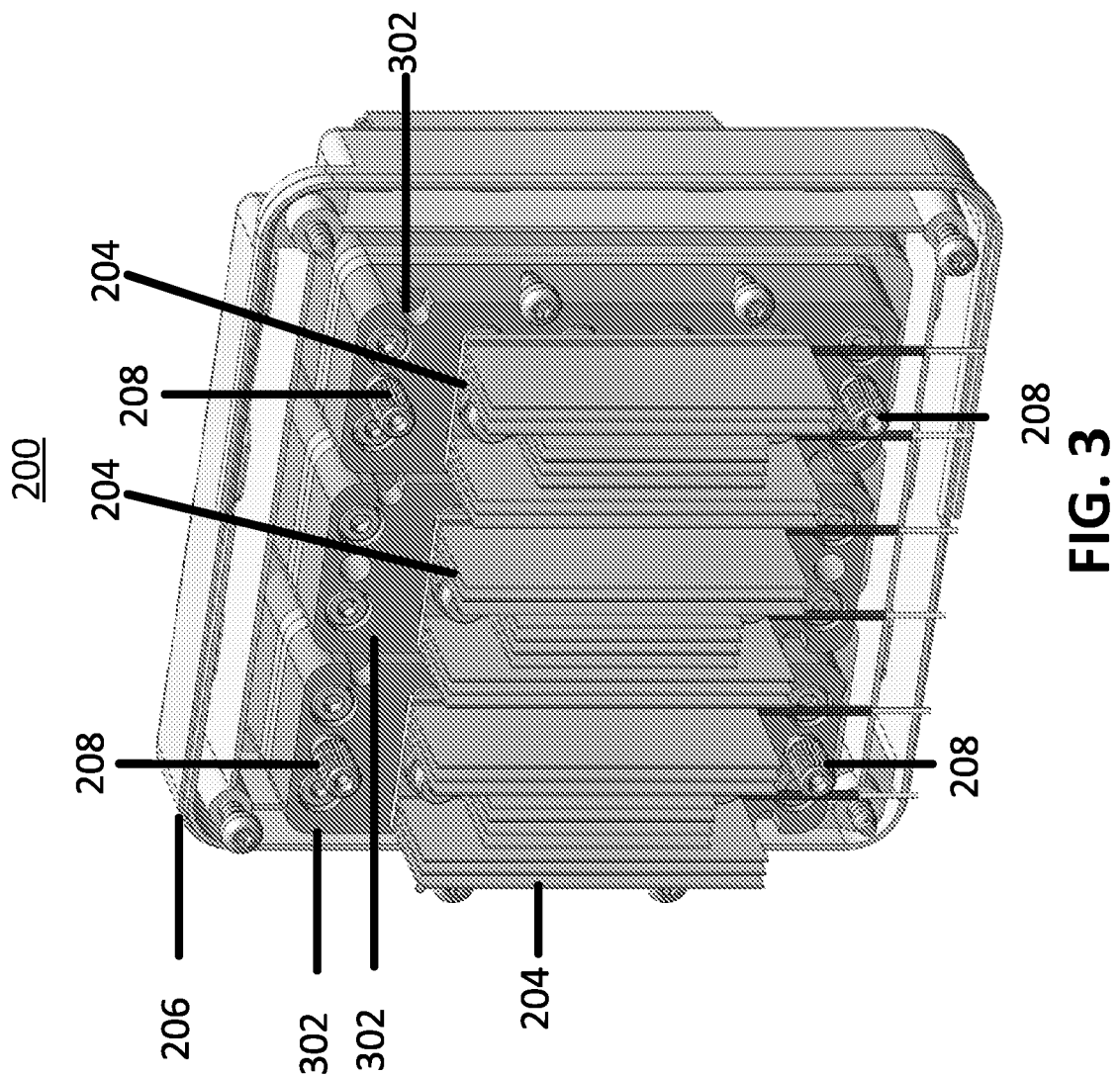
FIG. 3 shows a perspective view of a combined transfer module, according to one implementation.

FIG. 3 depicts a cross section of the combined transfer module 200 shown in FIG. 2 with a portion of the temperature-controlled enclosure 206 removed. The same heat sinks 204 are shown, and three individual transfer modules 302 are shown including ports 208. In this instance, there are separate thermoelectric coolers (e.g., Peltier effect coolers)

associated with each heat sink 204, and on each side of the individual transfer modules 302.

Figure 4A:
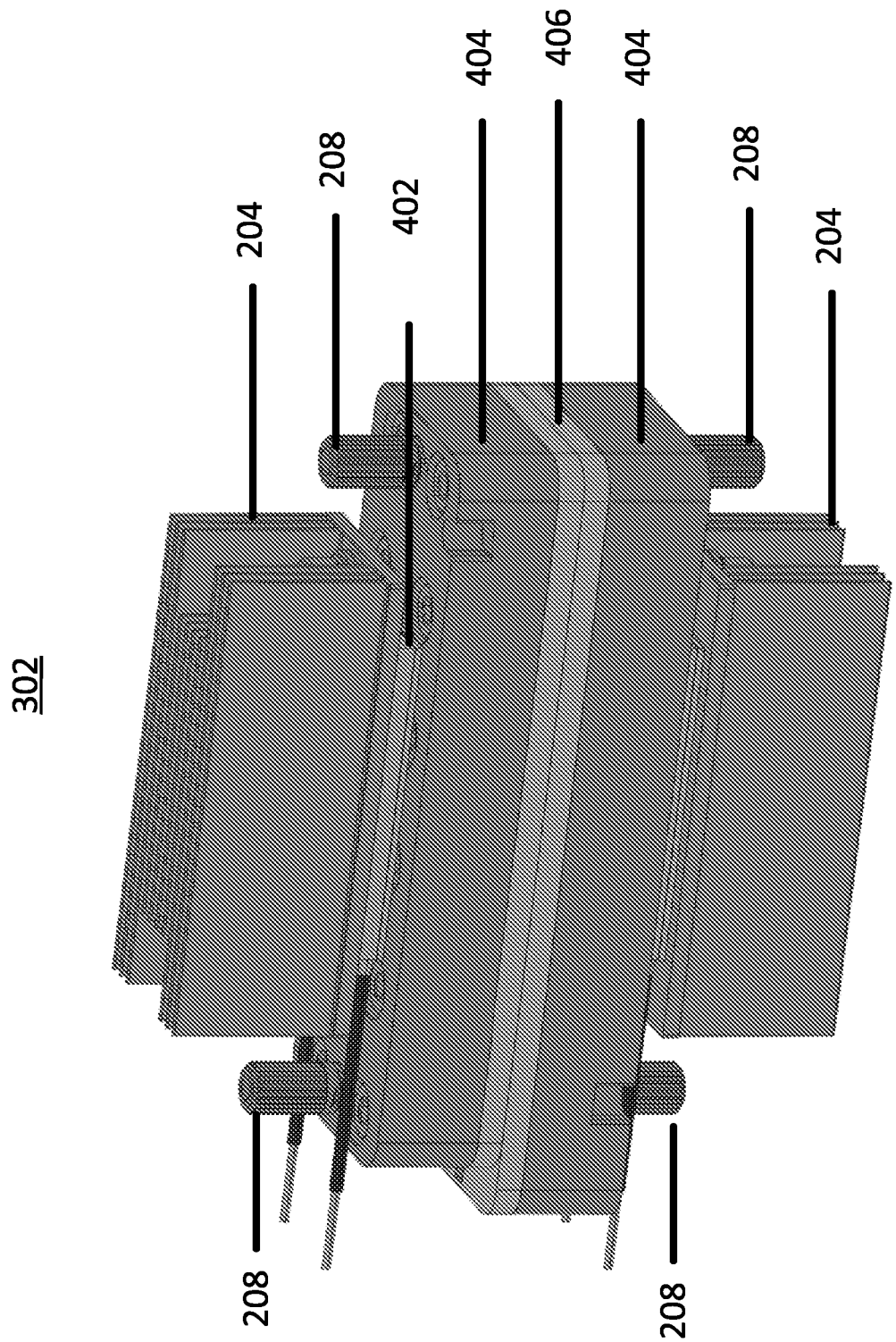
FIGS. 4A-4B show a transfer module including a conductivity cell according to one implementation.
Figure 4B:
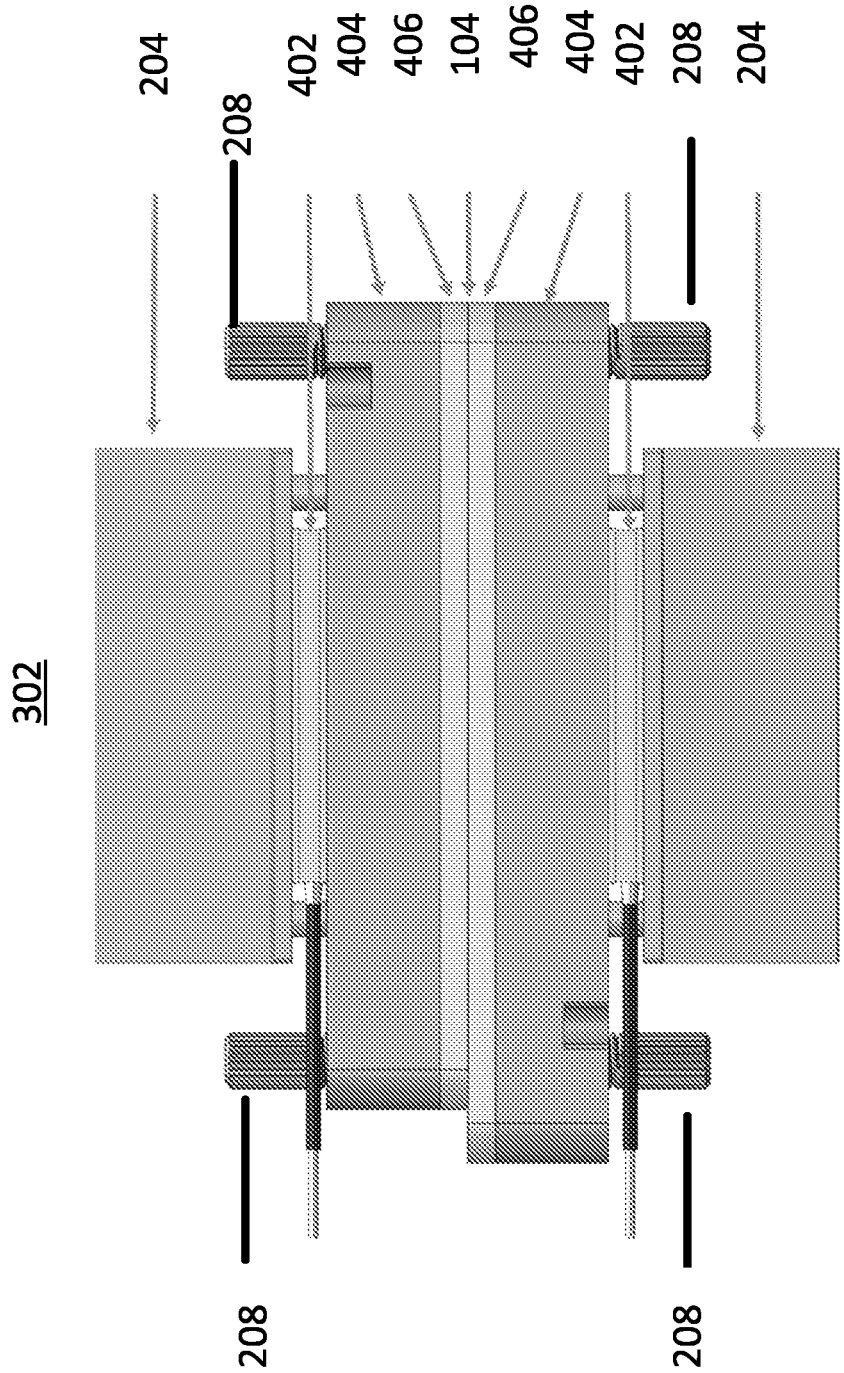

FIGS. 4A and 4B depict a single temperature-controlled transfer module 302, as depicted in FIGS. 2 and 3. FIG. 4A shows a perspective view of the transfer module 302, and FIG. 4B depicts a side view of the transfer module 302. The transfer module 302 includes two heat sinks 204, two thermoelectric coolers 402, and two transfer plates 406. The membrane 104 is positioned between the two transfer plates 406 such that the membrane 104 separates the two fluid channels (not shown) formed in the two transfer plates 406. Fluids can enter and exit the transfer module 302 through fluid ports 208, and the fluid ports 208 are attached to holes that pass through the clamp plates 404. In implementations configured to analyze the $CO_2$ content of a fluid stream, the membrane 104 can be a $CO_2$ permeable membrane, and a second fluid stream can include deionized water, therefore $CO_2$ can pass from the first fluid stream to the second stream, and the second fluid stream can be analyzed (e.g. by measuring the conductivity of the second fluid stream) to determine the $CO_2$ content of the first fluid stream. Different materials can be used to form different components shown in FIG. 4A and FIG. 4B. As a non-limiting example, the heat sinks 204 can be made of aluminum, the clamp plates 404 can be made of aluminum, and the transfer plates 406 can be formed using PCTFE. The heat sinks 204 and thermoelectric coolers are used to maintain the transfer module 302, and the fluids that enter it, at the desired temperature such that measurements involving the fluids can be conducted at the desired temperature.

Figure 5:
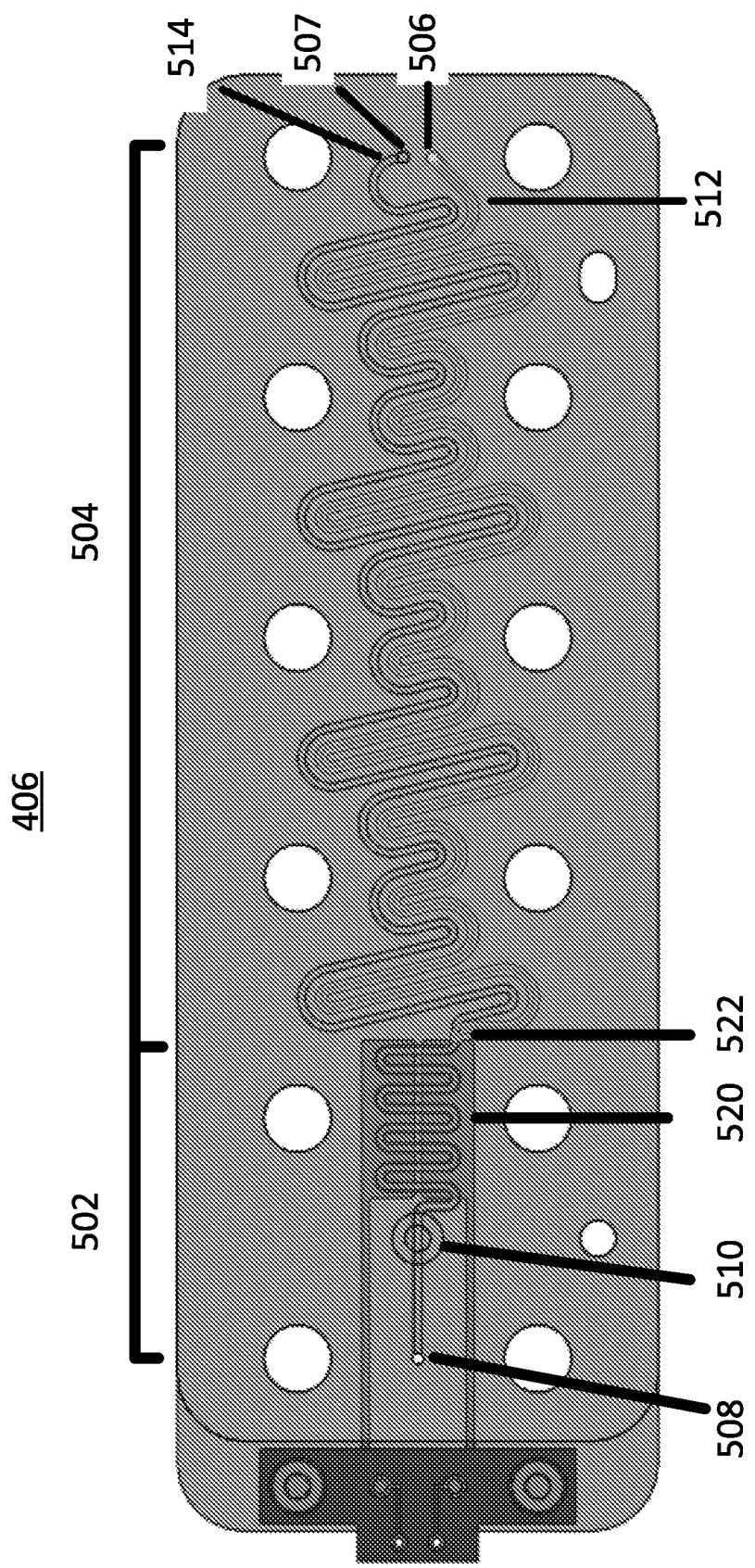
FIG. 5 shows a cutaway view of a pair of transfers plate including flow channels according to one implementation.

FIG. 5 depicts a top view of two transfer plates 406 including fluid channels 512 514 arranged in a serpentine configuration. The fluid channels 512, 514 are formed in separate transfer plates, and, as shown in FIG. 4B, a membrane (not shown) is between the two transfer plates 406. The first fluid channel 512 can carry deionized water, and the second fluid channel 514 can carry sample water, or vice-versa. Different types of sample water can be used, and non-limiting examples of sample water include sample water that has been oxidized, or sample water that has reagents added to it (for example, reagents selected to adjust the pH of the water). Non-limiting examples of ways that the sample can be oxidized include ultraviolet light, chemical oxidation, heating, catalytic conversion. Fluid enters the first fluid channel 512 at the first inlet 506 and is cooled (or heated) in a first section 504 of the transfer plates 406. Fluid enters the second fluid channel 514 at the second inlet 507 and is cooled (or heated) in the first section 504. At the end of the first section 504 of each fluid channel 512, 514, the fluid channels 512, 514 begin to overlap at a junction 522. This junction 522 is the beginning of the second section 502 of the fluid channels 512, 514.

In the second section 502, the fluid channels 512, 514 are aligned so that the fluid channels 512, 514 overlap as seen from above in FIG. 5. In the second section 502 of each fluid channels 512, 514, gas transfer can occur across the membrane (not shown) that separates the fluid channels 512, 514. This second section 502 can also include interdigitated electrodes 520, which can be configured to take a kinetic conductivity measurement of the fluid in the first fluid channel 512. Therefore, the gas transfer across the membrane and the conductivity measurement occur at the same time at the same desired temperature, while fluids flow through the second section 502 of the first fluid channel 512. The kinetic conductivity measurement can be converted into an equilibrium conductivity measurement (for example, by using Fick's diffusion laws). Similarly, kinetic curves can be used to estimate the equilibrium value of a measurement. Implementations described herein can perform measurements of organic carbon, total organic carbon, total inorganic carbon, and sample conductivity at the desired temperature in approximately 15 seconds.

In some instances, a temperature measurement device 510 may be positioned so that the temperature of the fluid can be measured after the fluid exits the second section 502 of the fluid channels 512, 514. Advantageously, having the temperature measurement device at this location allows control of the environment to a desired temperature at the point of $CO_2$ transfer and conductivity measurement. This disclosure also contemplates placing the temperature measurement device 510 at different points along the serpentine of one or both fluid channels 512, 514 or in other locations inside the transfer module or using multiple temperature measurement devices 510. As a non-limiting example, the temperature measurement device 510 may be placed so that it measures the temperature of the fluid passing through the fluid channels 512, 514 before a conductivity measurement is performed. The fluid then exits the fluid channels 512, 514, and exits the transfer plates at outlets 508 formed in each transfer plate 406. One non-limiting example of a temperature measurement device 510 is a thermistor, though other devices may be used.

Figure 22:
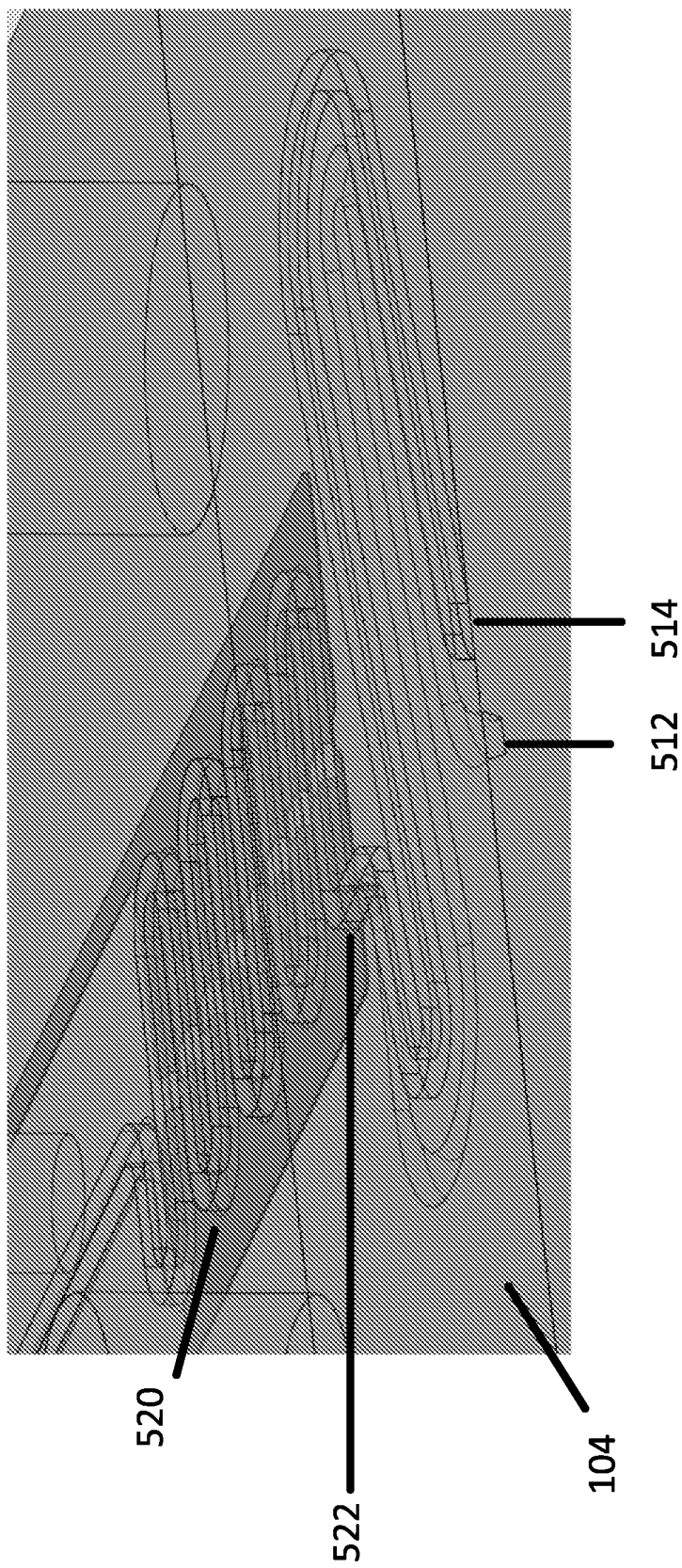
FIG. 22 shows a perspective view of a fluid channel formed in a transfer plate, according to one implementation.

A cutaway perspective view of FIG. 5 is shown in FIG. 22. Two fluid channels 512, 514 are formed in the transfer plates (not shown). Each of the transfer plates are temperature-controlled. As shown in FIG. 22, a portion of the fluid channels 512, 514 do not overlap. At the junction 522, the fluid channels 512, 514 begin to overlap but are separated by the membrane 104. When the fluid channels 512, 514 are separated by the membrane 104, gas transfer through the membrane 104 is possible. Interdigitated electrodes 520 can measure the conductivity of one or both fluid channels. In some implementations, the interdigitated electrodes 520 are configured to measure the conductivity of the fluid in the second fluid channel 514. For example, in some implementations, the membrane 104 is a $CO_2$ permeable membrane and the second fluid channel 514 carries deionized water, such that $CO_2$ in the first fluid channel 512 can diffuse into the second fluid channel 514. Therefore, according to some implementations, the conductivity of the fluid in the second fluid channel 514 can represent the concentration of $CO_2$ in the second fluid channel 514. As described above, the interdigitated electrodes 520 can perform conductivity measurements as fluids flow through one or both fluid channels 512, 514 at the desired temperature.

Figure 21:
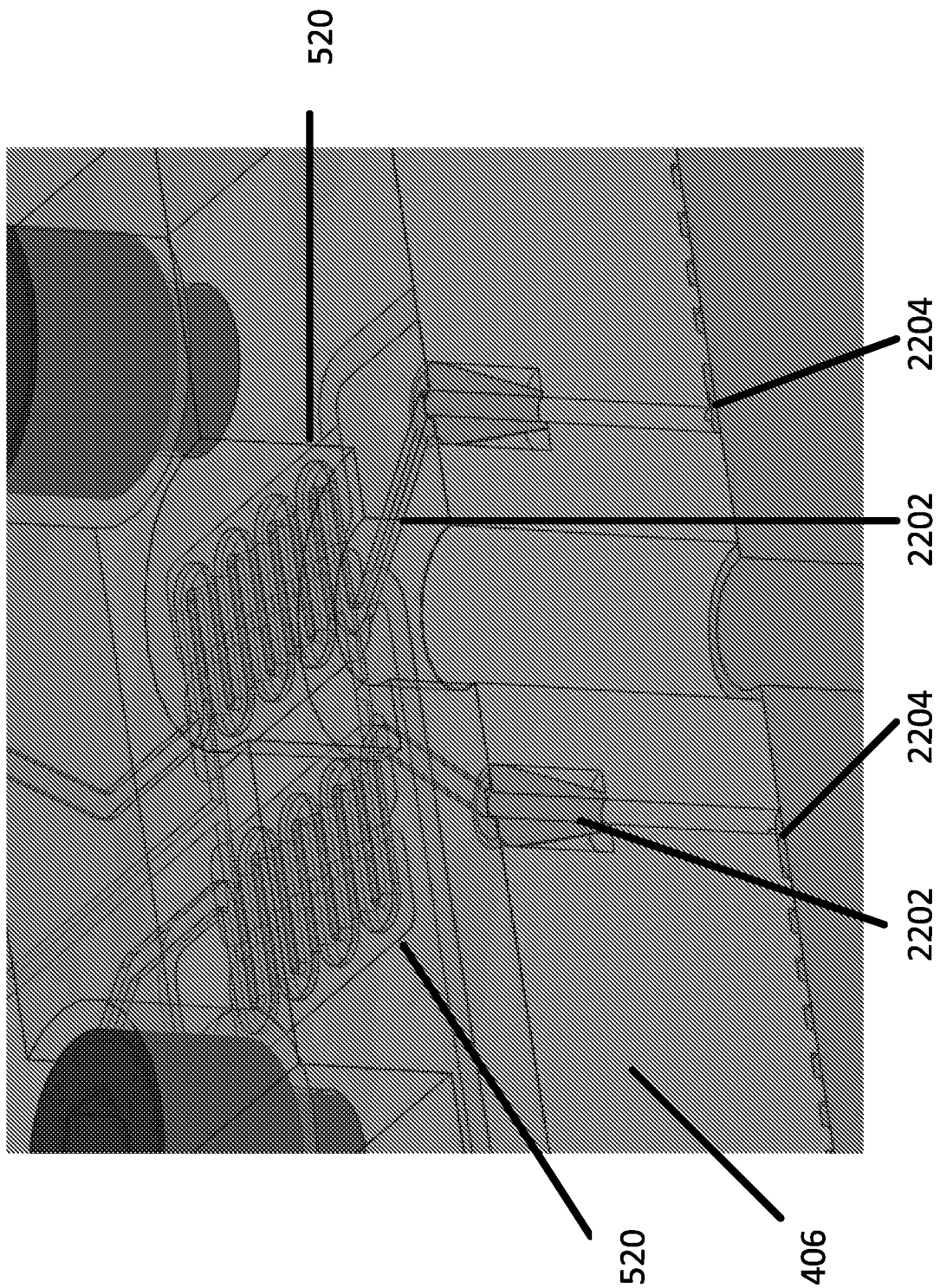
FIG. 21 shows a perspective view of a transfer module including transfer channels configured to allow fluid flow across the membrane.

Additionally, with reference to FIG. 21, implementations described herein can include a transfer plate 406 with transfer channels 2202 that allow fluids to cross the membrane (not shown) through perforations in the membrane (not shown). According to the implementation shown in FIG. 21, two or more sets of interdigitated electrodes 520 can be included in the transfer plate 406. Further, implementations including transfer channels 2202 can effectively control the temperature of the fluids when one side of one transfer plate 406 is temperature controlled. Each of one or more fluid channels 2204 can be temperature controlled on the same side of the membrane, and, prior to gas transfer, some fluid channels can pass through the transfer channels 2202 to be on the opposite sides of the membrane from other fluid channels. As a non-limiting example, implementations including transfer channels 2202 can include four fluid channels (not shown) on the same side of the membrane, allowing four fluid channels to be temperature controlled simultaneously from one side of one transfer plate 406. The four fluid channels can include a fluid channel for sample water, a fluid channel related to the measurement of inorganic carbon concentration, a fluid channel related to the measurement of total carbon concentration, and a fluid channel containing deionized water.

Alternative configurations of transfer plate and fluid channels are contemplated. For example, FIGS. 6A-6B depict alternative implementations with different shapes of fluid channel 512. In the non-limiting example shown in FIG. 6A, the fluid channel 512 is approximately 8.75 inches in length.

Figure 7:
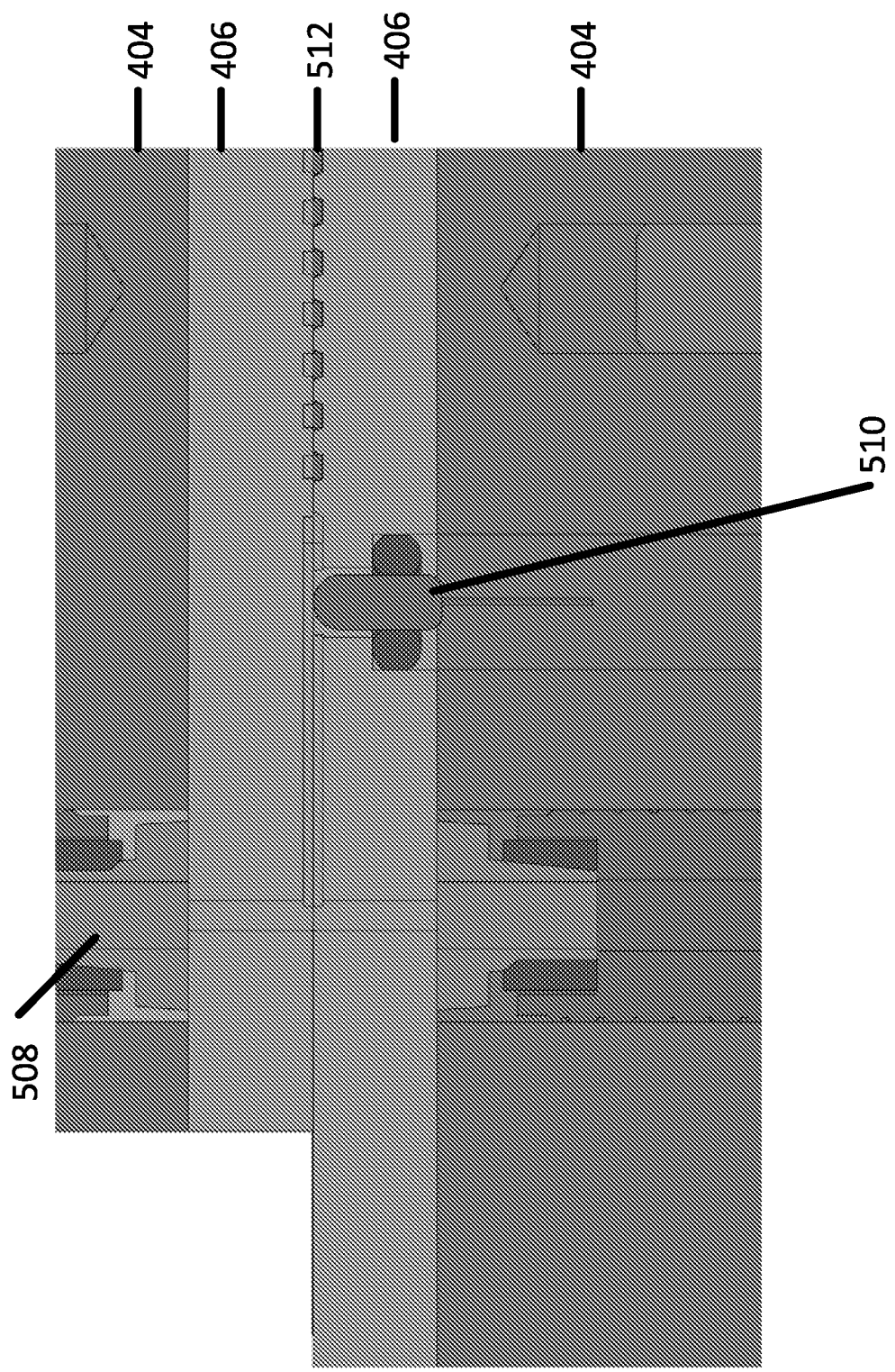
FIG. 7 shows a side view of a transfer module including a thermistor, according to one implementation.

FIG. 7 illustrates a cross sectional view of a portion of a transfer module. The fluid channel 512 is formed between the two transfer plates 406, and a temperature measurement device 510 (e.g., thermistor) is positioned to measure the temperature of the fluid passing through the transfer module before the fluid exits the transfer module at the outlet 508.

Figure 8:
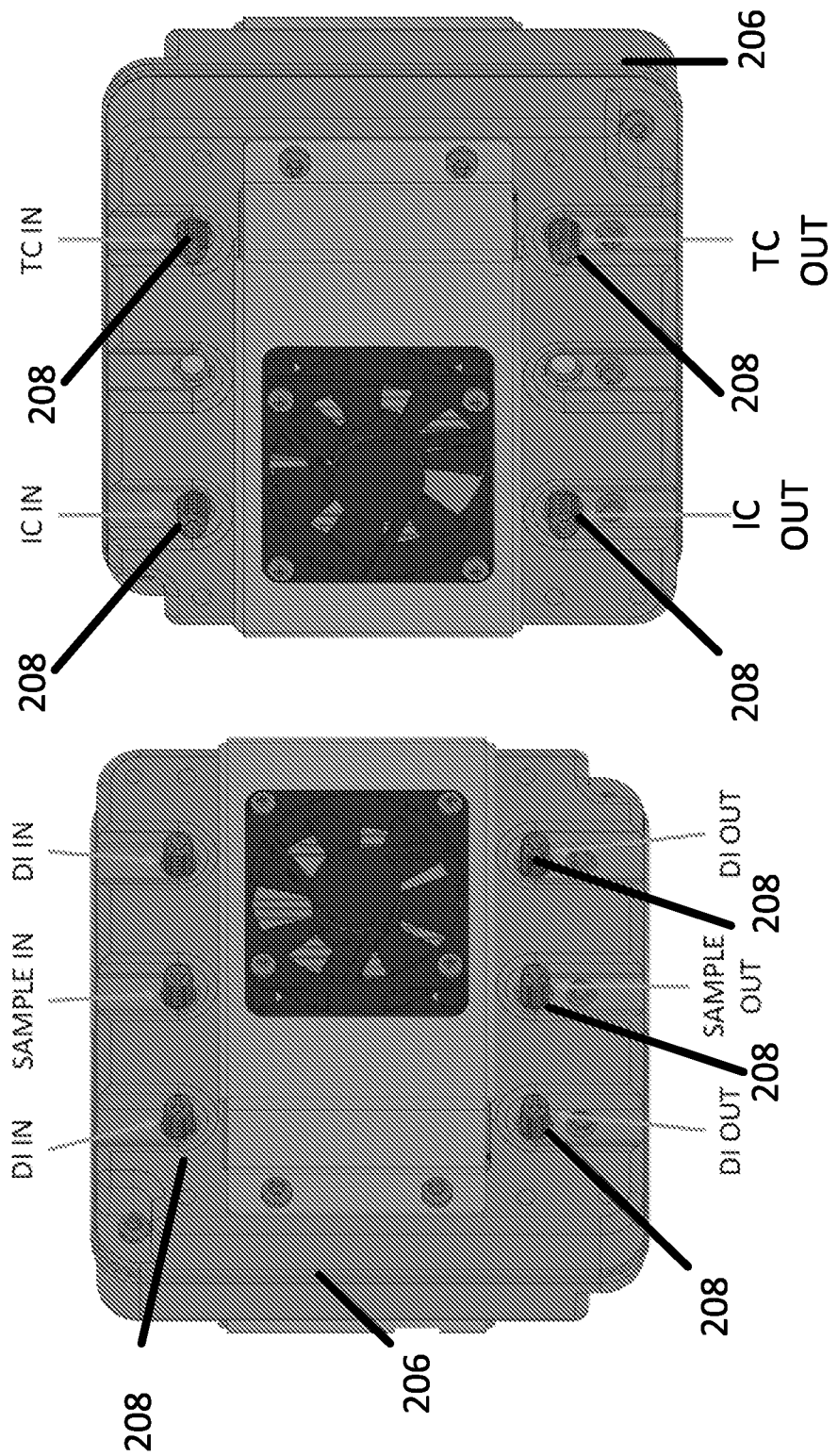
FIGS. 8A and 8B show perspective views of enclosures.

FIGS. 8A and 8B show perspective views of the front (FIG. 8A) and back (FIG. 8B) of a combined transfer module including three transfer modules (not shown) inside an enclosure 206. The enclosure 206 includes output and input ports 208 for fluids to flow in and out of each transfer module (not shown) within the enclosure 206. Different arrangements of ports 208 are contemplated, and the transfer modules (not shown) can be arranged in different orders or configurations. In the non-limiting example shown in FIG. 9, the ports 208 include input/output ports for DI water, sample water, Total organic carbon solution, and total inorganic carbon solution.

Figure 9:
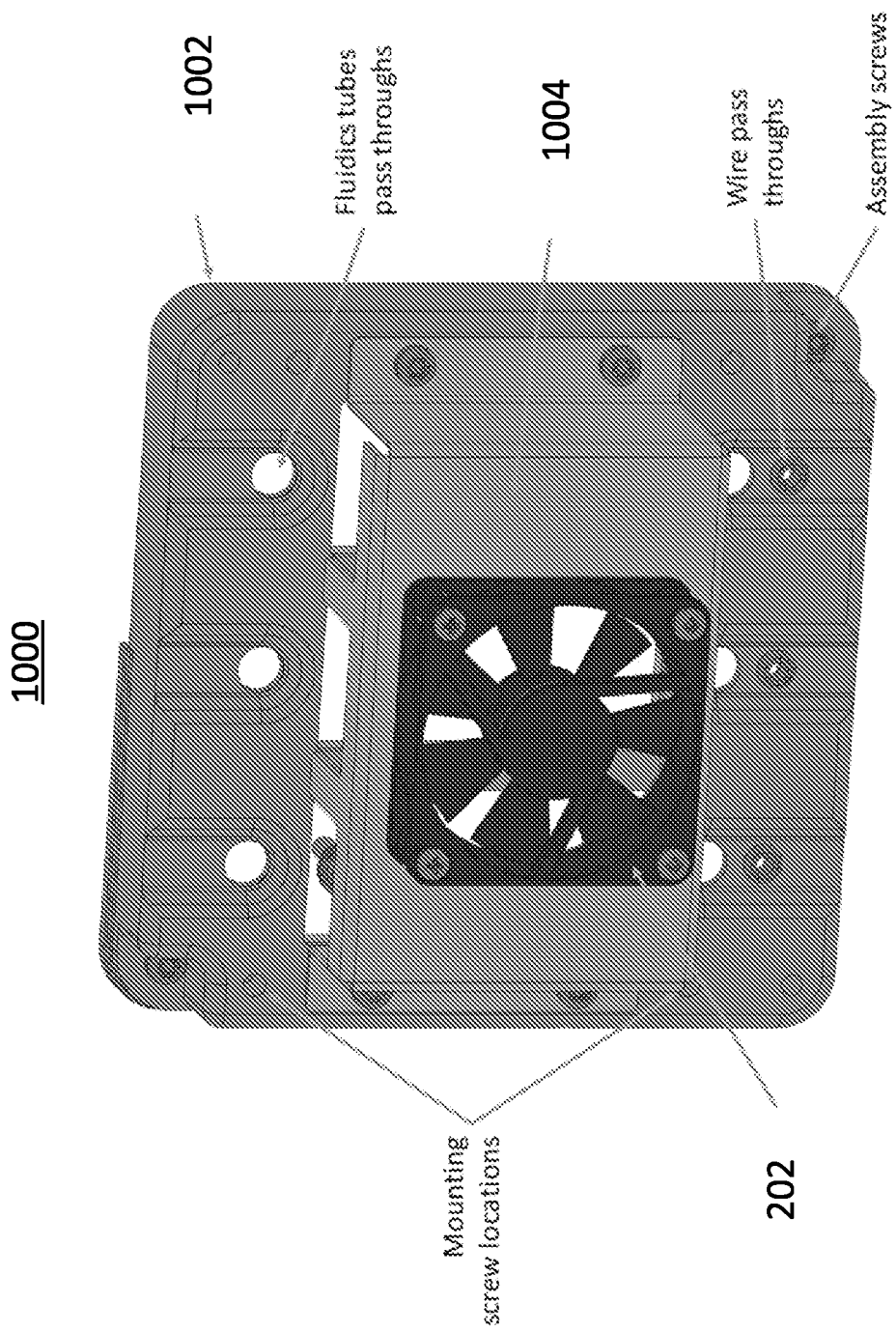
FIG. 9 shows a perspective view of one side of an enclosure, according to one implementation.

FIG. 9 shows a front view of one side 1000 of a temperature-controlled enclosure (e.g. the enclosure shown in FIG. 2) for a combined transfer module. One example of the temperature-controlled enclosure (not shown) includes a shroud piece 1002, a duct piece 1004 attached to the shroud piece 1002, and a fan 202 mounted on the duct piece. The shroud piece 1002 is configured to attach to another shroud piece (not shown) to at least partially enclose the one or more transfer modules that make up the combined transfer module. Holes in the shroud piece 1002 allow for assembly screws, wiring, and fluidics tubes to pass through the shroud piece to connect to the transfer modules.

Figure 10:
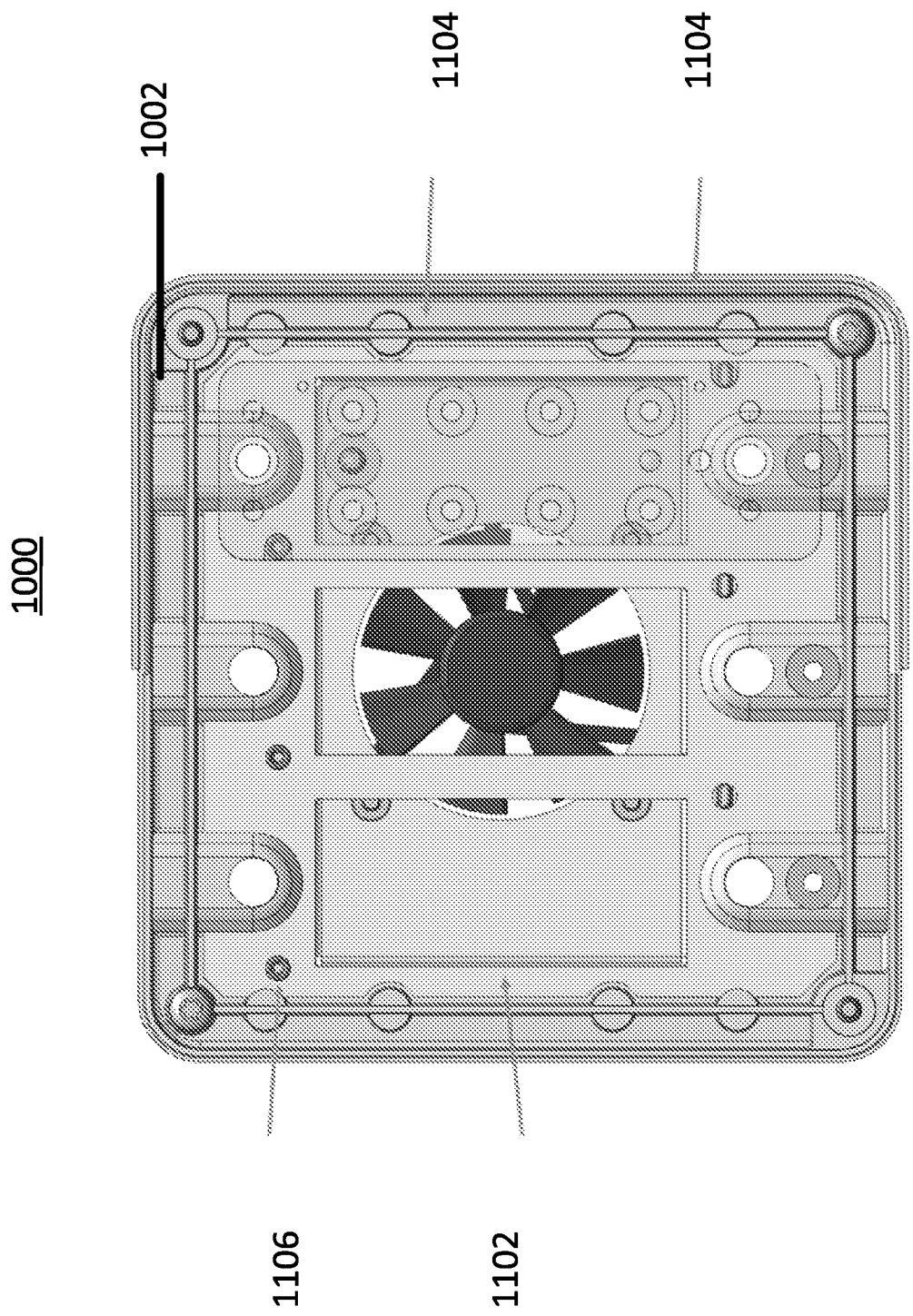
FIG. 10 shows a rear view of one side of an enclosure, according to one implementation.

FIG. 10 shows a rear view of the side of the temperature-controlled enclosure depicted in FIG. 9. The side of the temperature-controlled enclosure includes alignment pins 1106 and an interlocking lip 1108. The shroud piece 1002 can include insulation 1102. For example, the insulation 1102 may be a foam pad covers the inside of the enclosure, and the insulation 1102 may be configured to seal the openings in the shroud piece 1002. In some implementations, the shroud pieces 1002 can also include an insulating wall 1104.

As previously stated, the enclosure configurations depicted in FIGS. 2, 3, 8, 9, and 10 are intended as non-limiting examples of enclosures that may be used for positioning and controlling the temperature of the transfer modules that are part of a combined transfer module. Other configurations of enclosure are contemplated.

Figure 11:
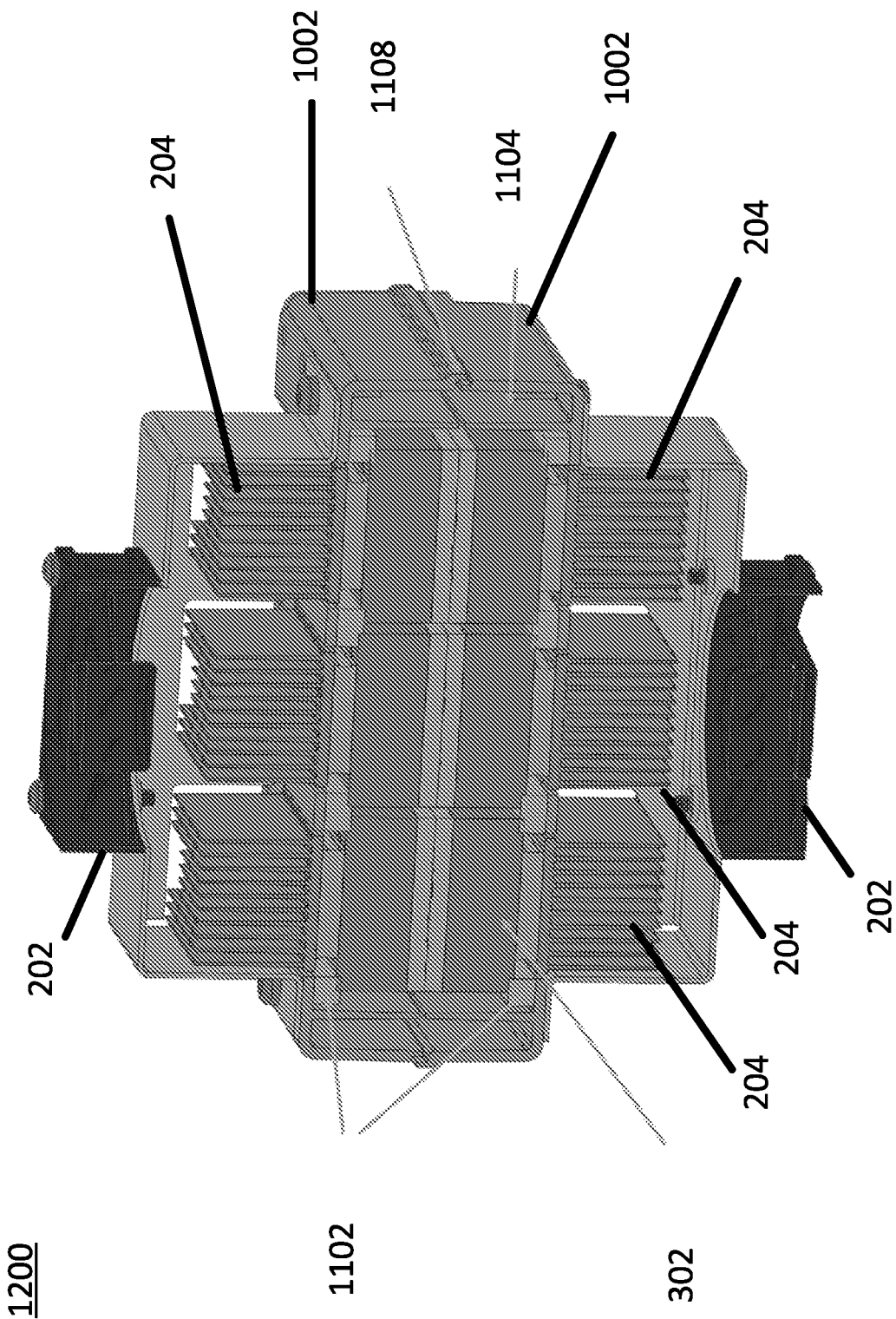
FIG. 11 shows a perspective view of a cross section of an enclosure including three transfer modules, according to one implementation.

FIG. 11 depicts a cross section of a temperature-controlled enclosure 1200 including three transfer modules 302. The enclosure 1200 includes two shroud pieces 1002 that are attached along an interlocking lip 1108. The enclosure 1200 includes an insulated wall 1104 and insulation 1102 on each shroud piece 1002. In the implementations shown in FIG. 11, the insulation 1102 is configured for insulation and sealing. Each shroud piece 1002 includes a set of heat sinks 204 and a fan 202. The transfer modules 302 may be held in place partially by the pressure exerted by the insulation 1102.

Figure 12A:
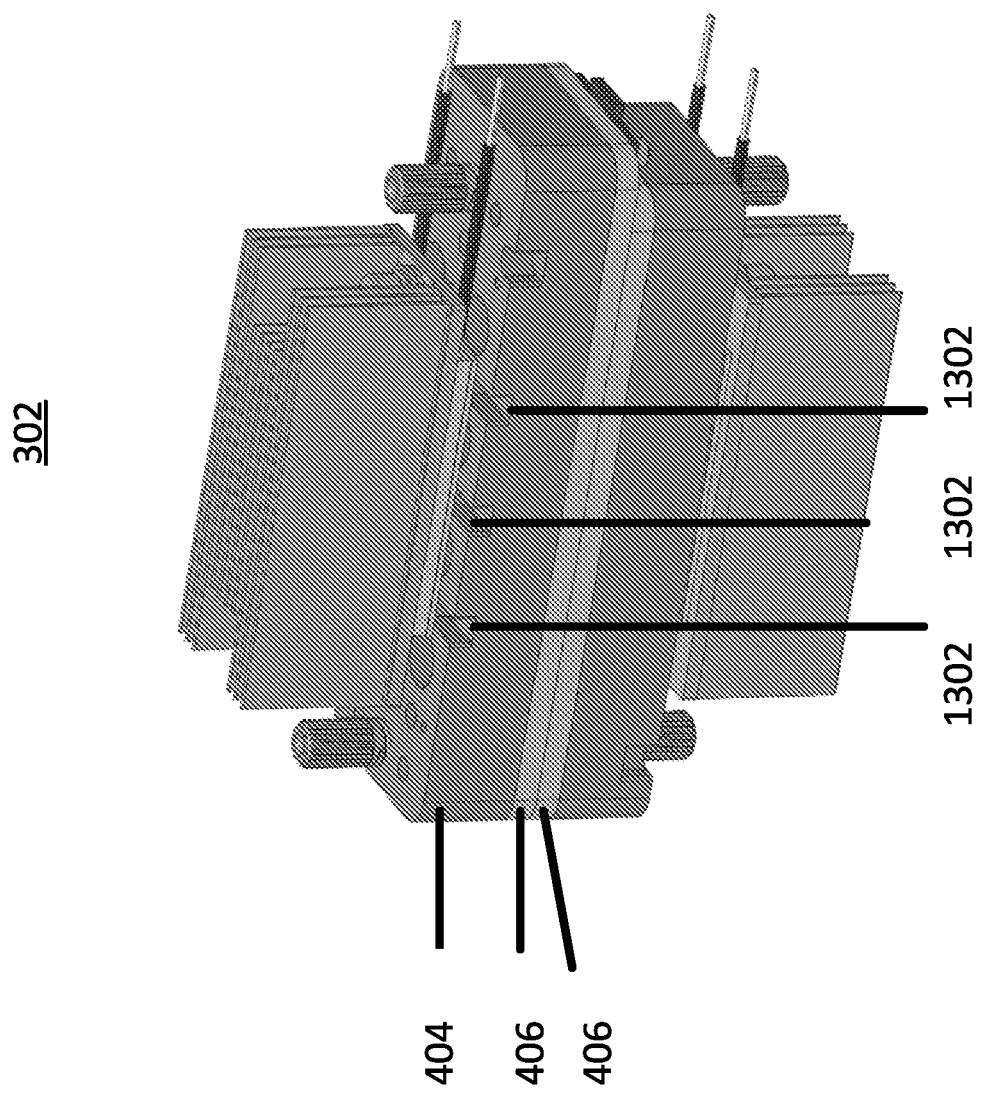
FIGS. 12A-12C show views of a transfer module including thermistors, according to implementations described herein. In particular.
Figure 12B:
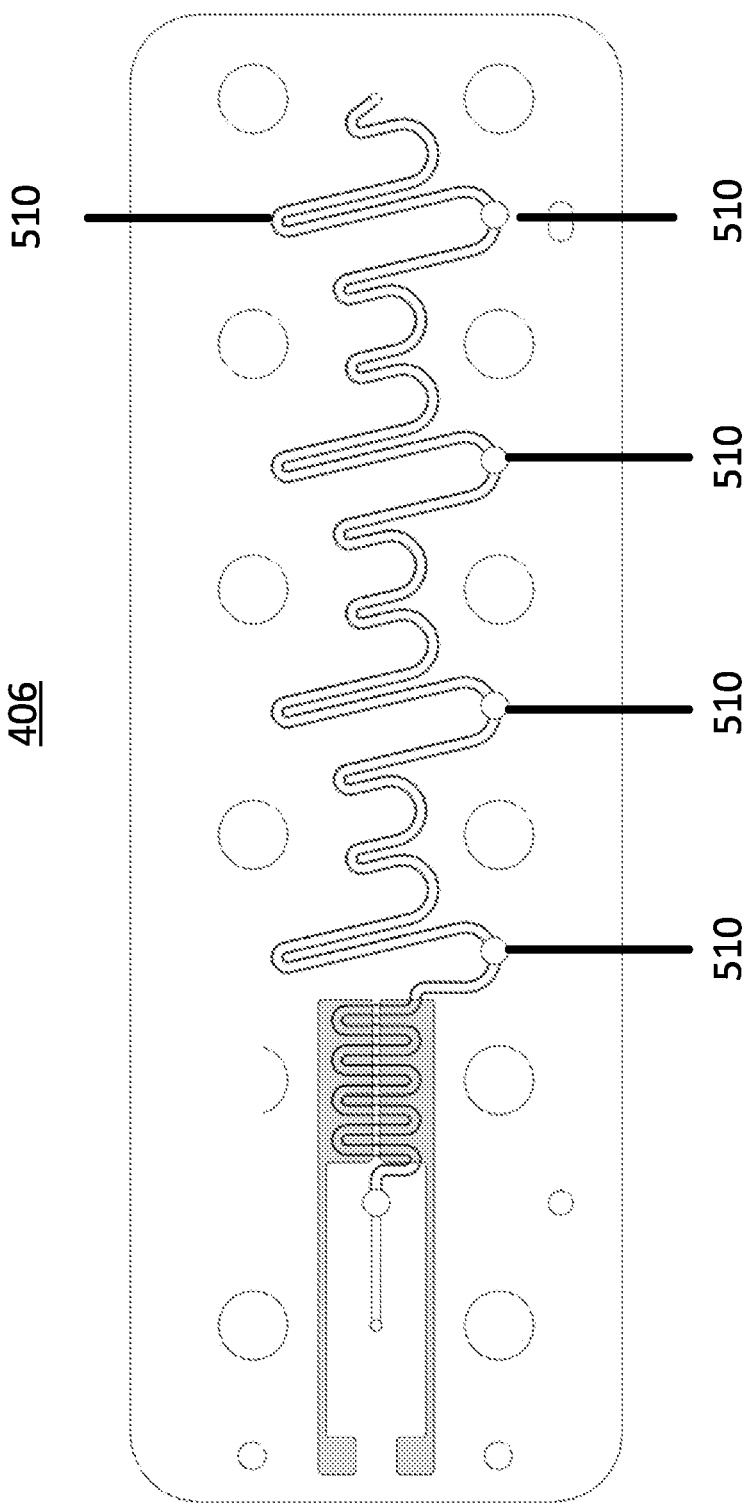
Figure 12C:
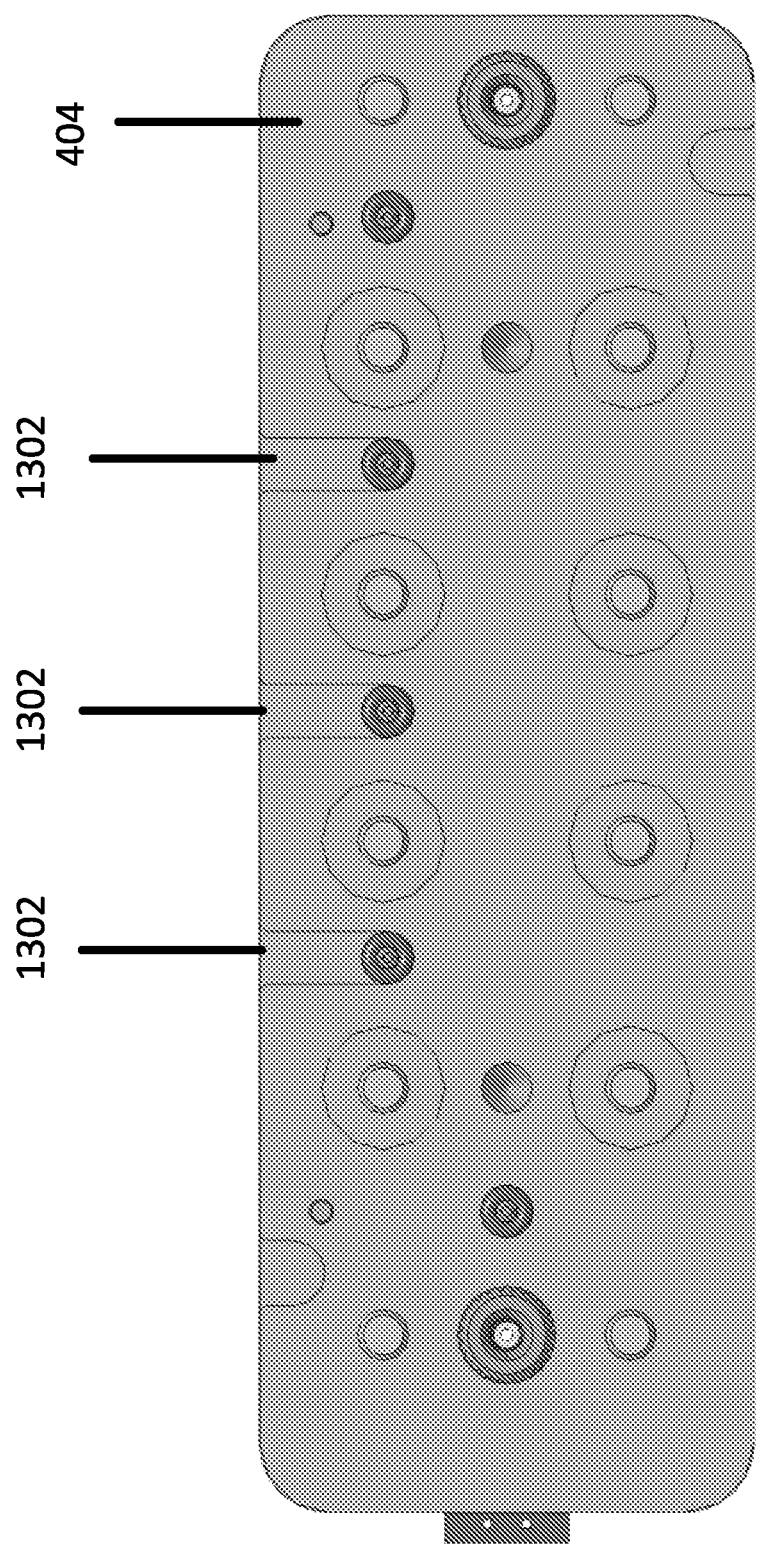

FIGS. 12A-12C depict a transfer module 302 including four temperature measurement devices 510 (e.g., thermistors). As shown in FIG. 12A, a clamp plate 404 can include slots 1302. The slots 1302 can allow for electrical (or optical) connections to the temperature measurement devices 510 or other sensors located on or near the fluid channels (not shown) formed in the transfer plates 406. As shown in FIG. 12B, the transfer plate 406 can contain more than one temperature measurement device 510 along the fluid channel 512. FIG. 12C is a top view of the transfer module depicted in FIG. 12A, showing the slots 1302 formed in the clamp plate 404.

Figure 13:
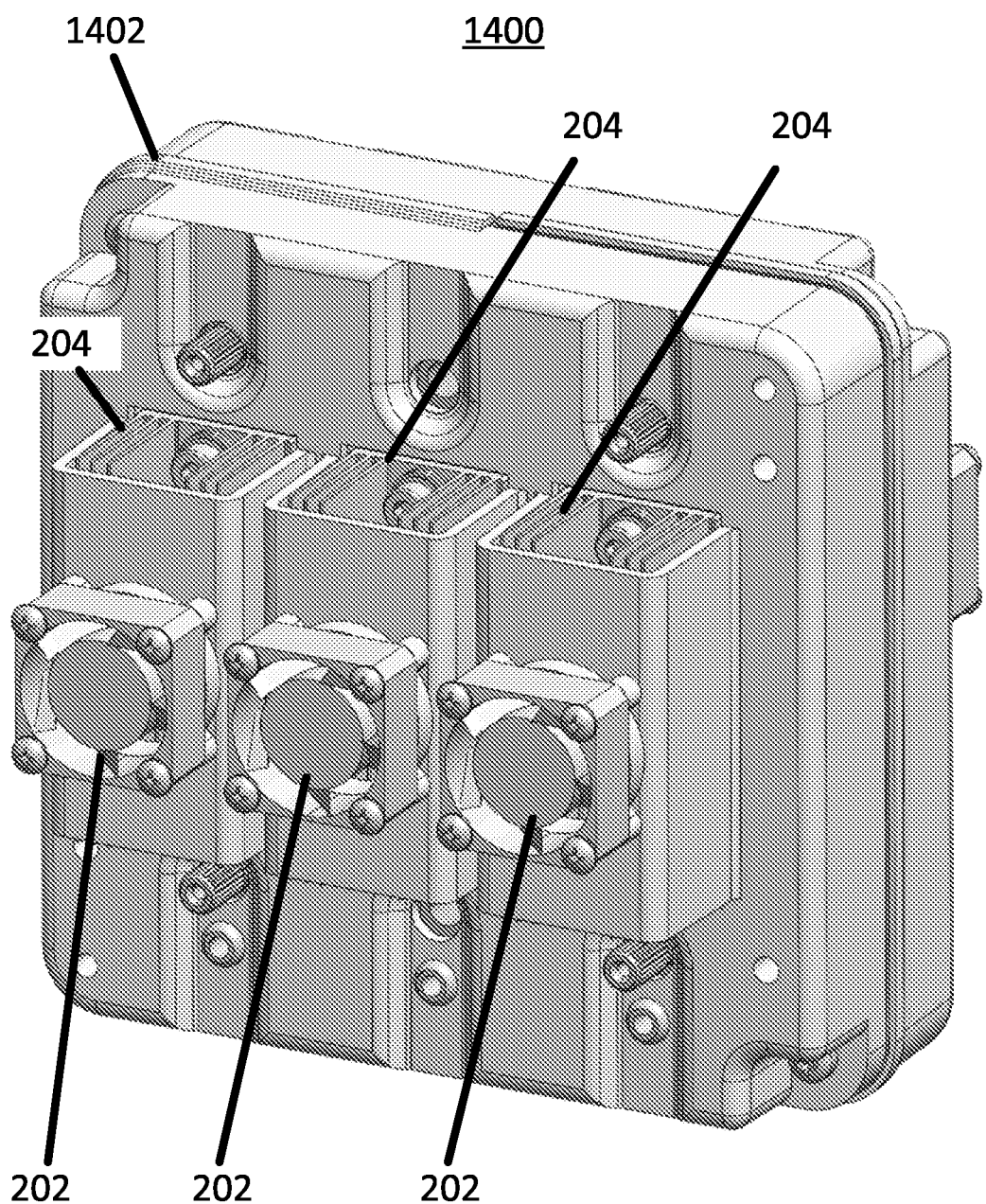
FIG. 13 shows a perspective view of an enclosure including three transfer modules according to one implementation.
Figure 23:
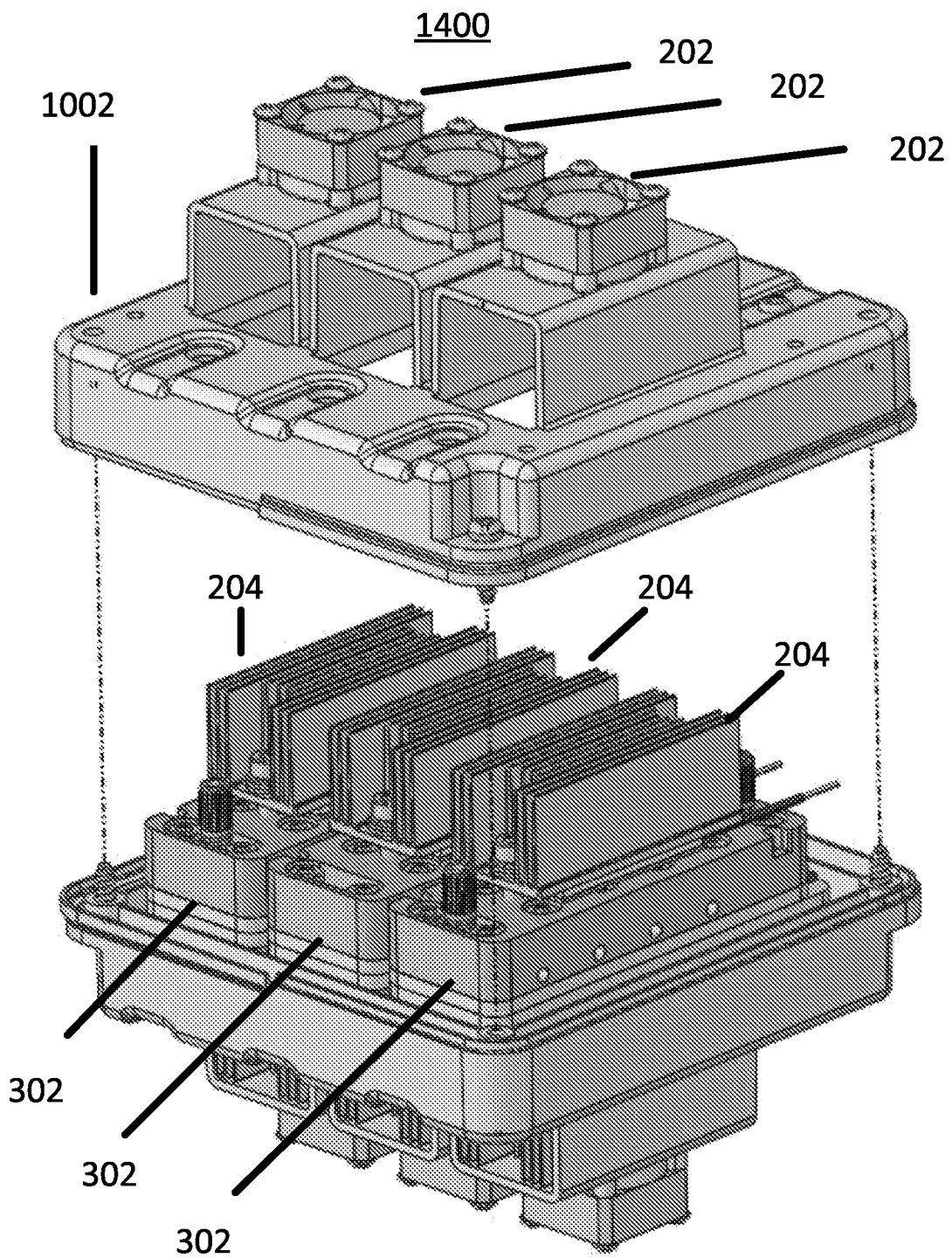
FIG. 23 shows a perspective view of a combined transfer module, with one shroud piece removed.

FIG. 13 depicts an alternative implementation of an enclosure 1402 for a temperature-controlled combined transfer module 1400. Three fans 202 are each positioned over three heat sinks 204 on one side of the combined transfer module. Different combinations of fans 202 and heat sinks 204 are contemplated. For example, in some implementations, multiple heat sinks 204 may be used for each side of each transfer module. Similarly, different numbers of fans 202 can be used to cool each heat sink 204. In some implementations, the fans 202 may not be attached to the enclosure 1402. Further, the use of alternative heating or cooling systems is contemplated, for example vapor compression refrigeration. Similarly, FIG. 23 depicts a perspective view of the temperature-controlled combined transfer module 1400 including three fans with the shroud piece 1002 removed. One side of each of the three transfer modules 302 is shown, including the three heat sinks 204 that correspond to the three fans 202 on the shroud piece 1002.

Figure 14:
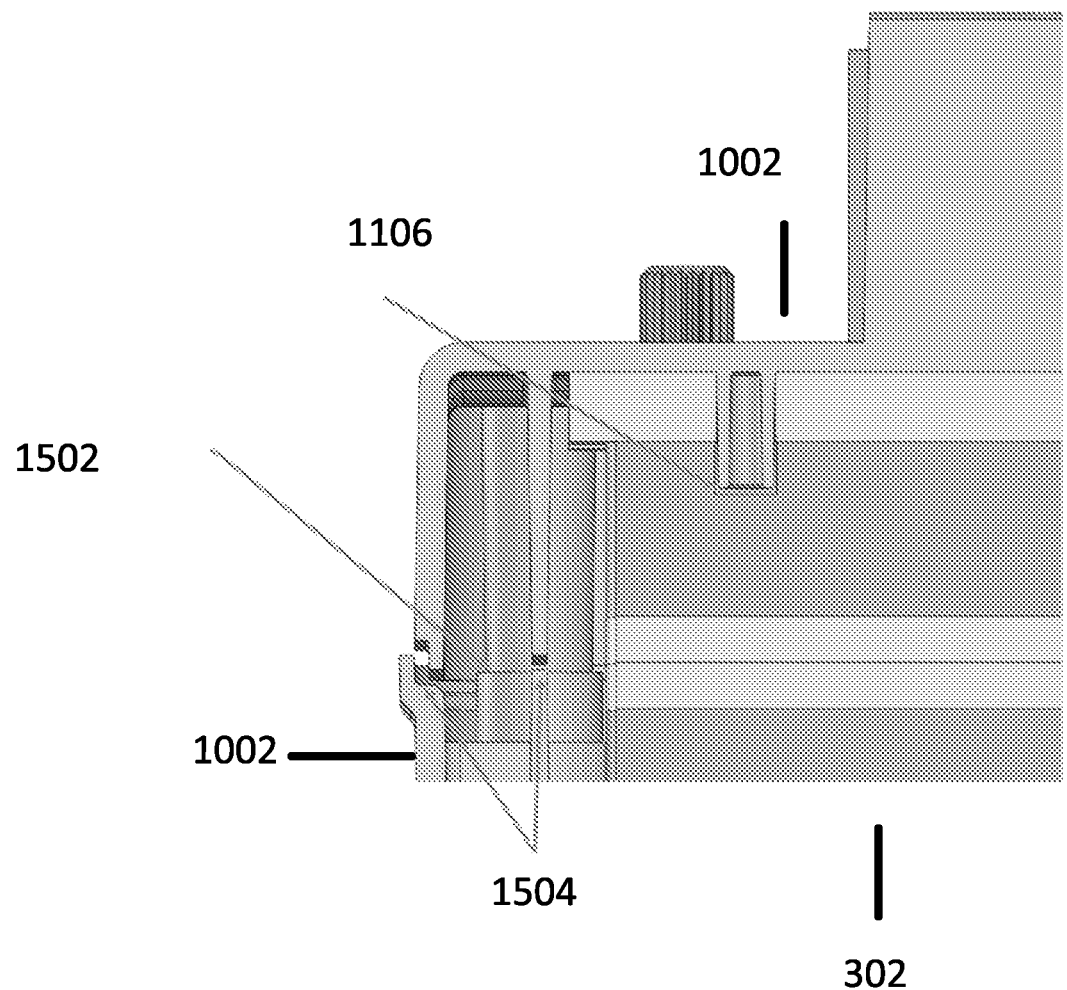
FIG. 14 shows a cross sectional view of a corner of an enclosure including a transfer module according to one implementation.

FIG. 14 is a cross sectional view of a corner of a temperature-controlled enclosure, according to one implementation. A shroud piece 1002 can include one or more pins 1106 that can be used to position the transfer modules 302 relative to the shroud piece 1002. The spacing between the shroud pieces 1002 can be set using one or more bosses 1502, and the bosses 1502 can form one or more gaps 1504 between the shroud pieces 1002.

Figure 15:
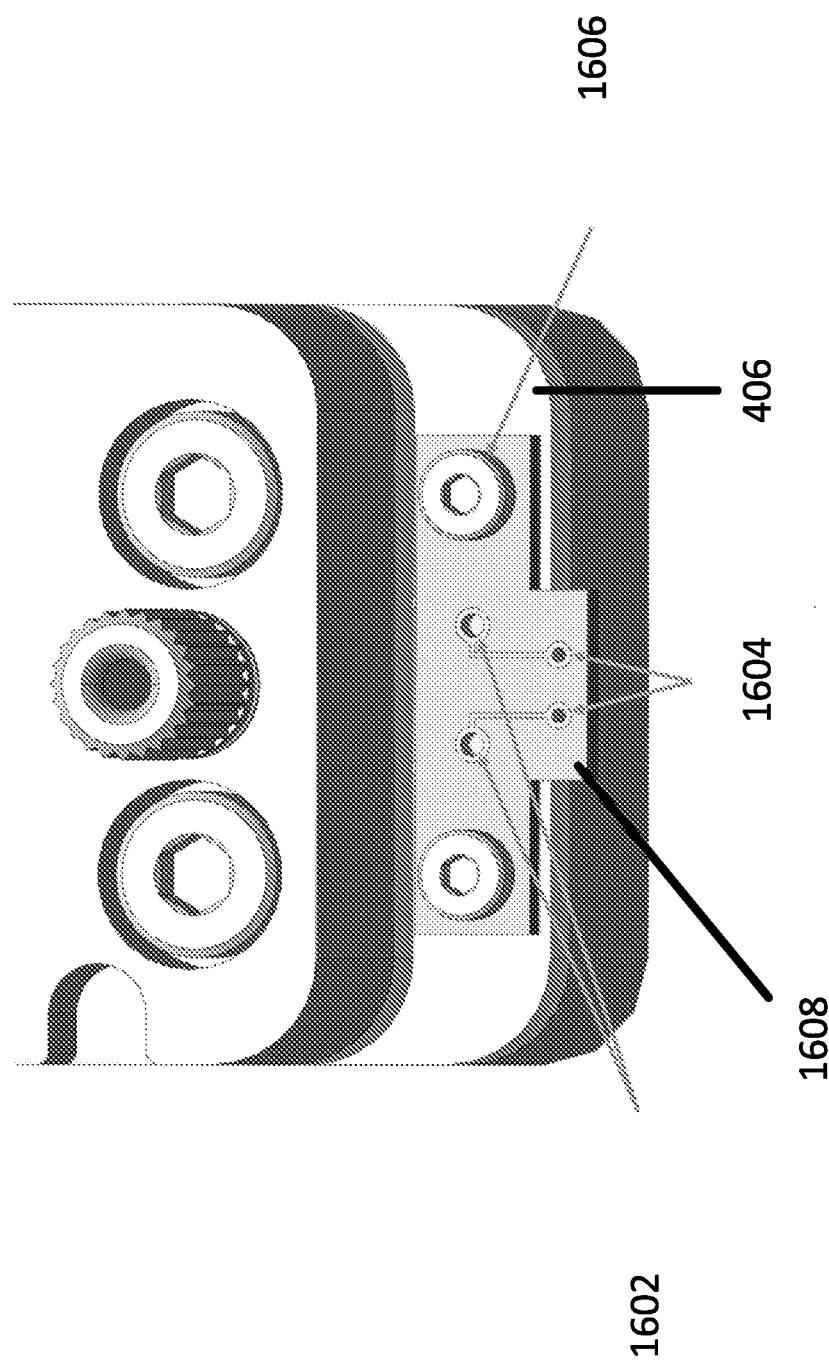
FIG. 15 shows a perspective view of part of a transfer module including vias and solder points, according to one implementation.

FIG. 15 shows part of one transfer module 302, including an example of how wiring may be connected to the transfer module 302 using a printed circuit board ("PCB") 1608 including vias 1602 for connections to the transfer module 302 and attachment points 1604 for wiring (not shown). The PCB 1608 can be attached to the transfer module 302, e.g. by using screws 1606 that pass through the PCB 1608 and into the transfer plate 406.

Figure 16:
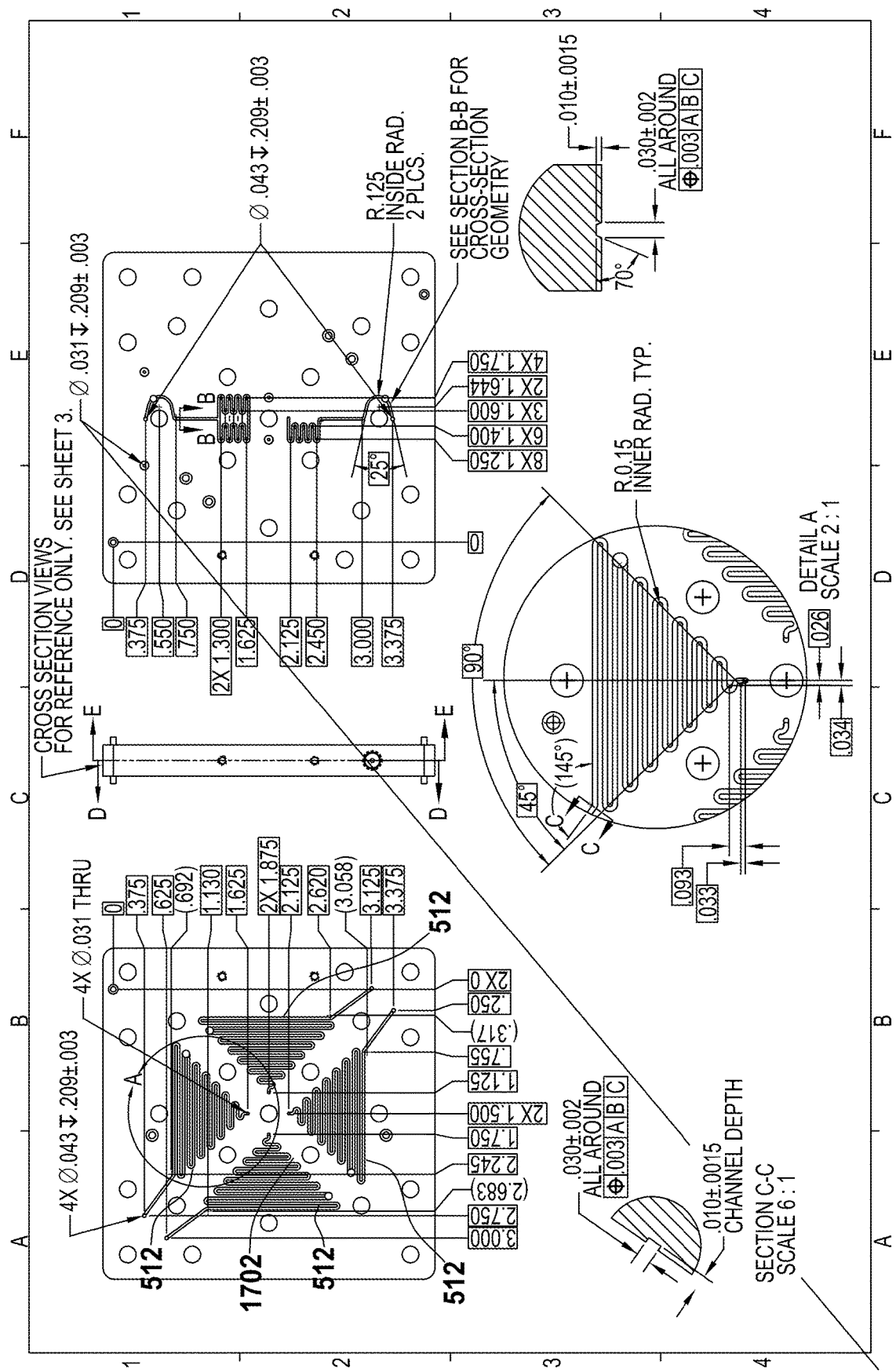
FIG. 16 shows front, back, side, and cross-sectional views of a transfer plate including four fluid channels, according to one implementation.
Figure 17:
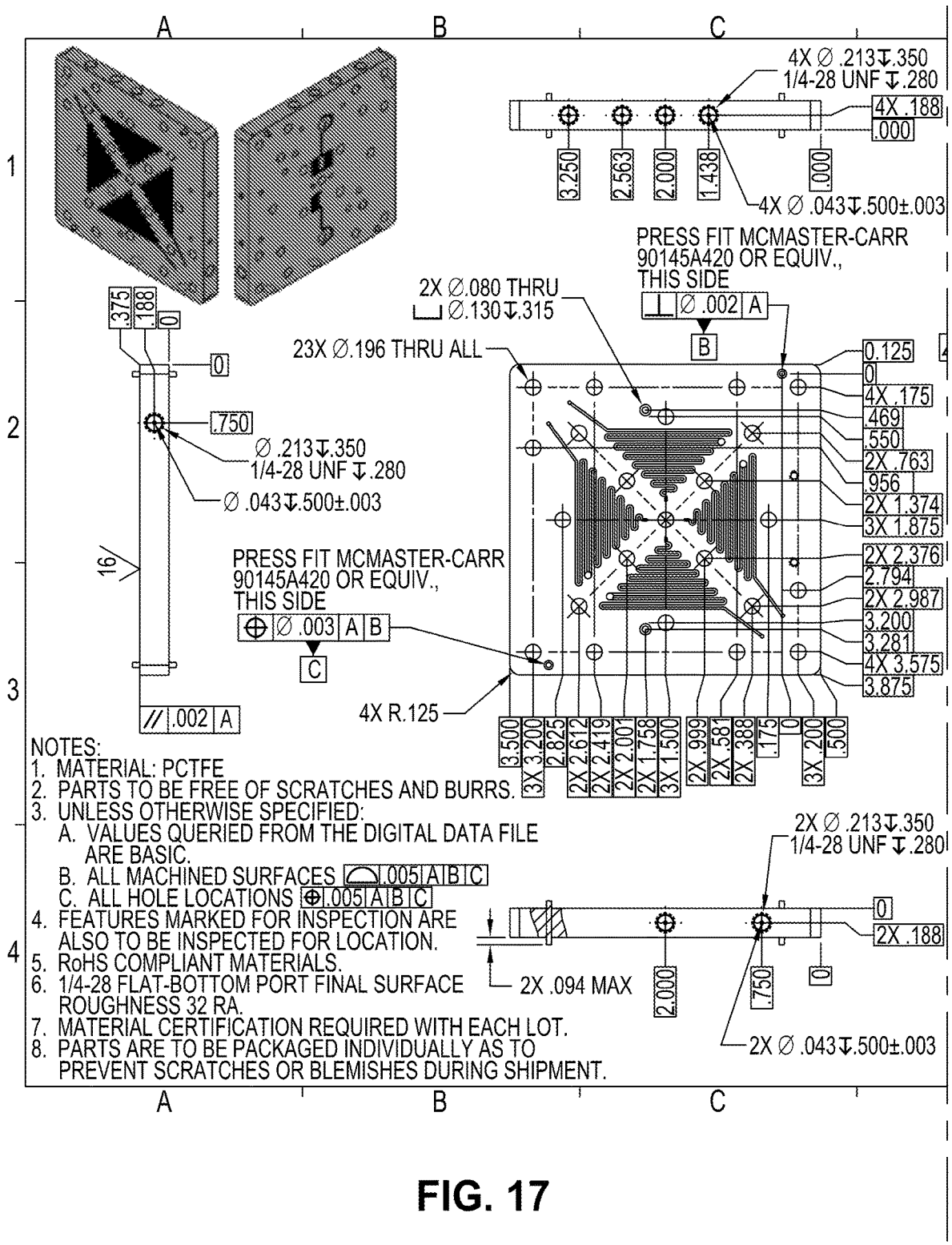
FIG. 17 shows perspective, front and back views of a transfer plate including four fluid channels, according to one implementation.
Figure 17:
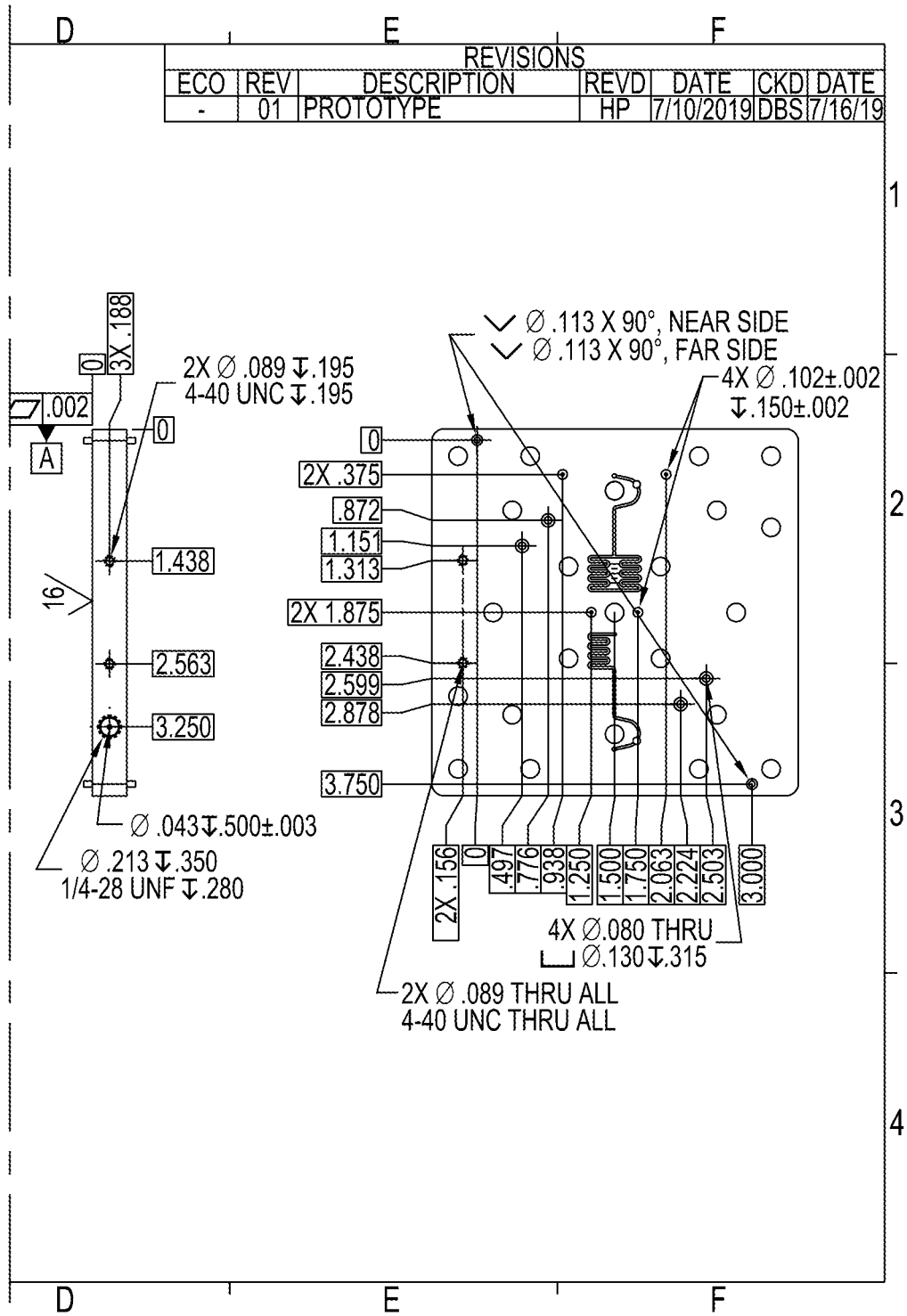
Figure 18:
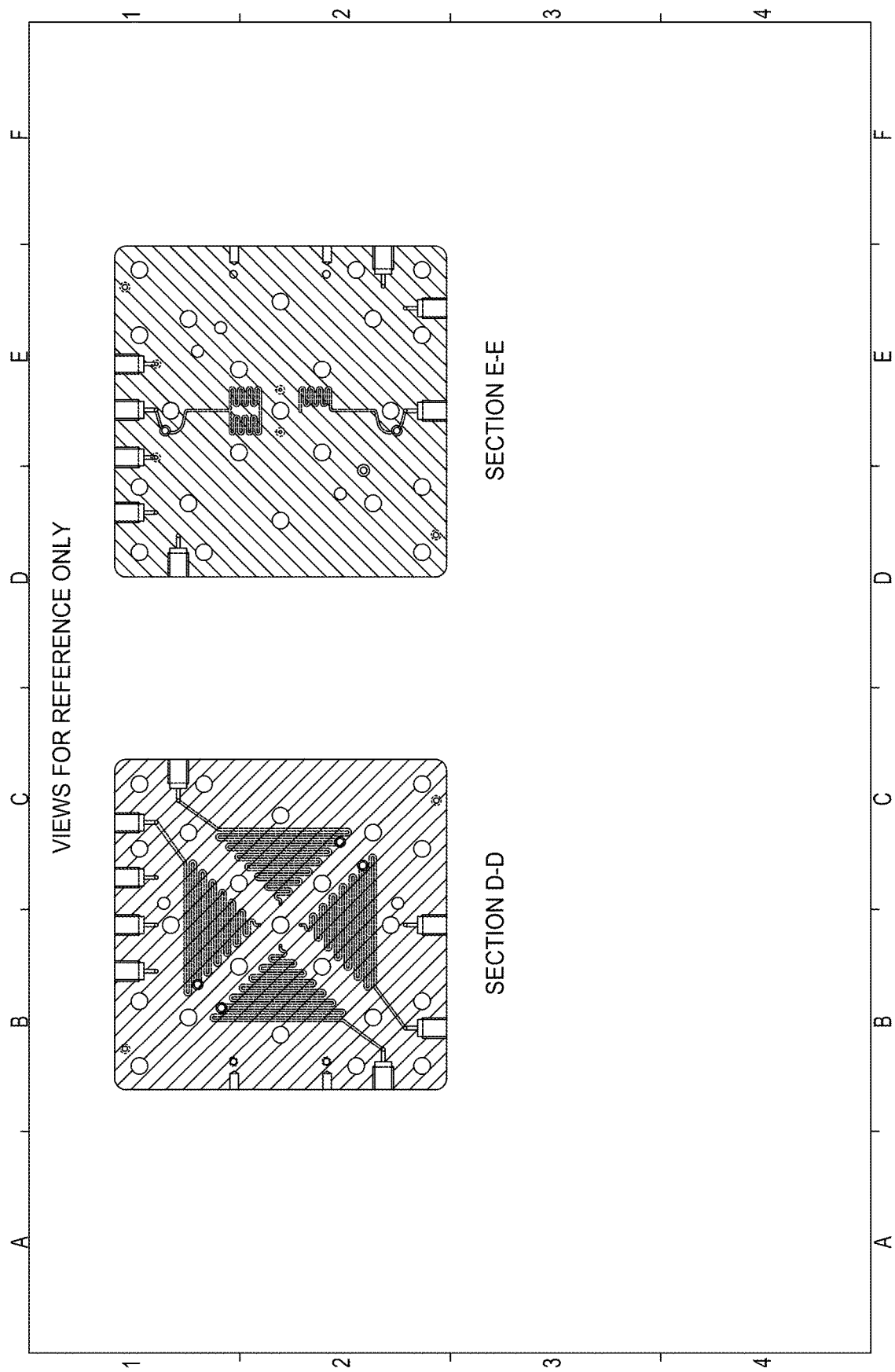
FIG. 18 shows two views of a transfer plate including four fluid channels, according to one implementation.

According to some implementations, multiple fluid channels can be combined within a single transfer plate. For example, referring to FIG. 16, a transfer plate 1702 is shown including four fluid channels 512 arranged as four serpentines. The single transfer plate can include input and output ports corresponding to the input and output channels described in FIG. 1 (i.e., the input streams can include a sample, reagents, and deionized water). Different numbers of transfer modules may be combined into a single transfer module, for example, transfer modules including any number of fluid streams are contemplated and may be used to perform the same or different water quality measurements than those described herein. Therefore, in some implementations, a combined transfer module (such as the transfer module 302 shown in FIG. 3) can be constructed using a single transfer module including four fluid channels 512, or with two transfer modules instead of three transfer modules. FIGS. 17 and 18 show alternative views of the transfer plate shown in FIG. 16. The dimensions shown in FIGS. 16, 17 and 18 are intended only as non-limiting examples.

Figure 19:
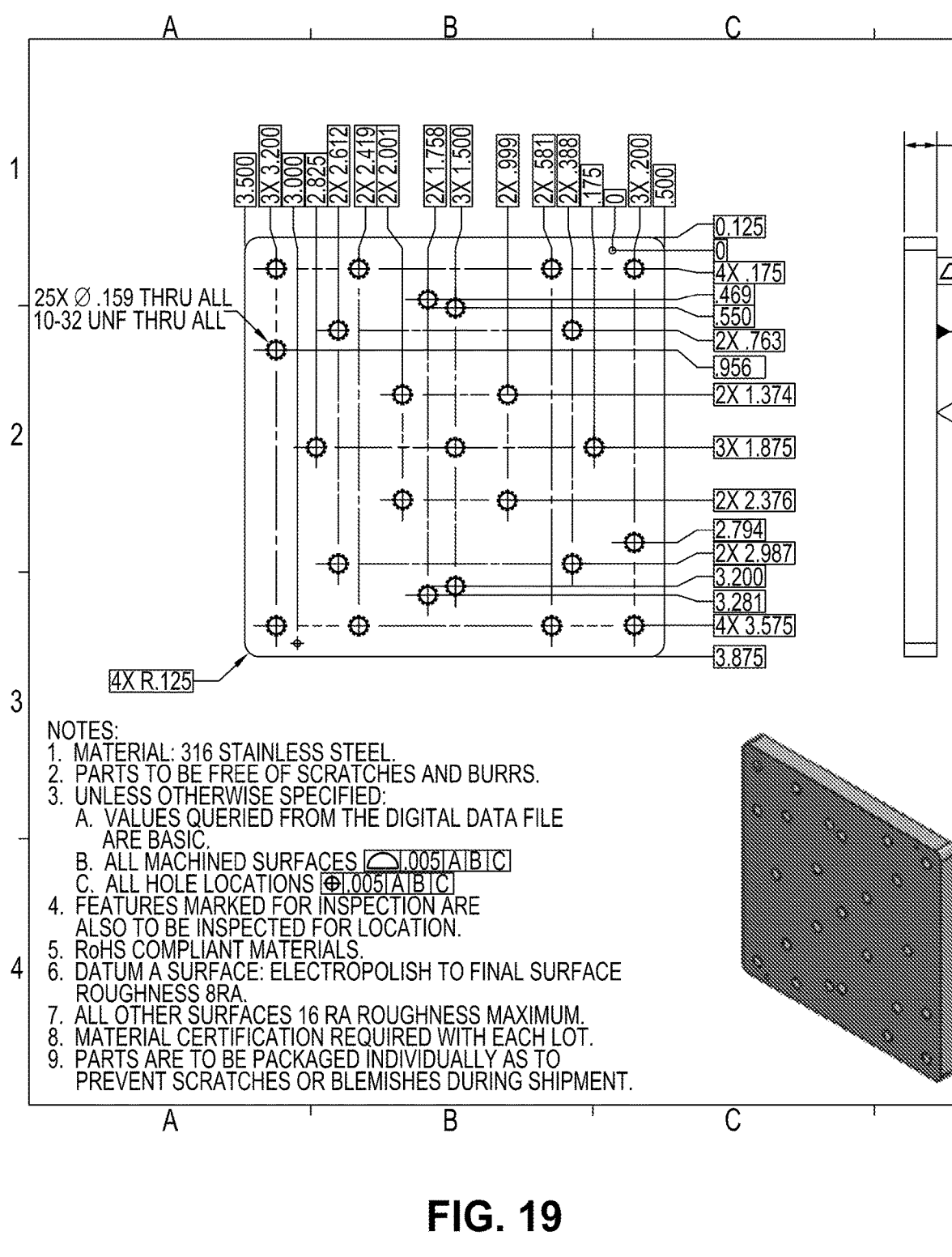
FIG. 19 shows a front view and back view of a clamp plate, according to one implementation.
Figure 19:
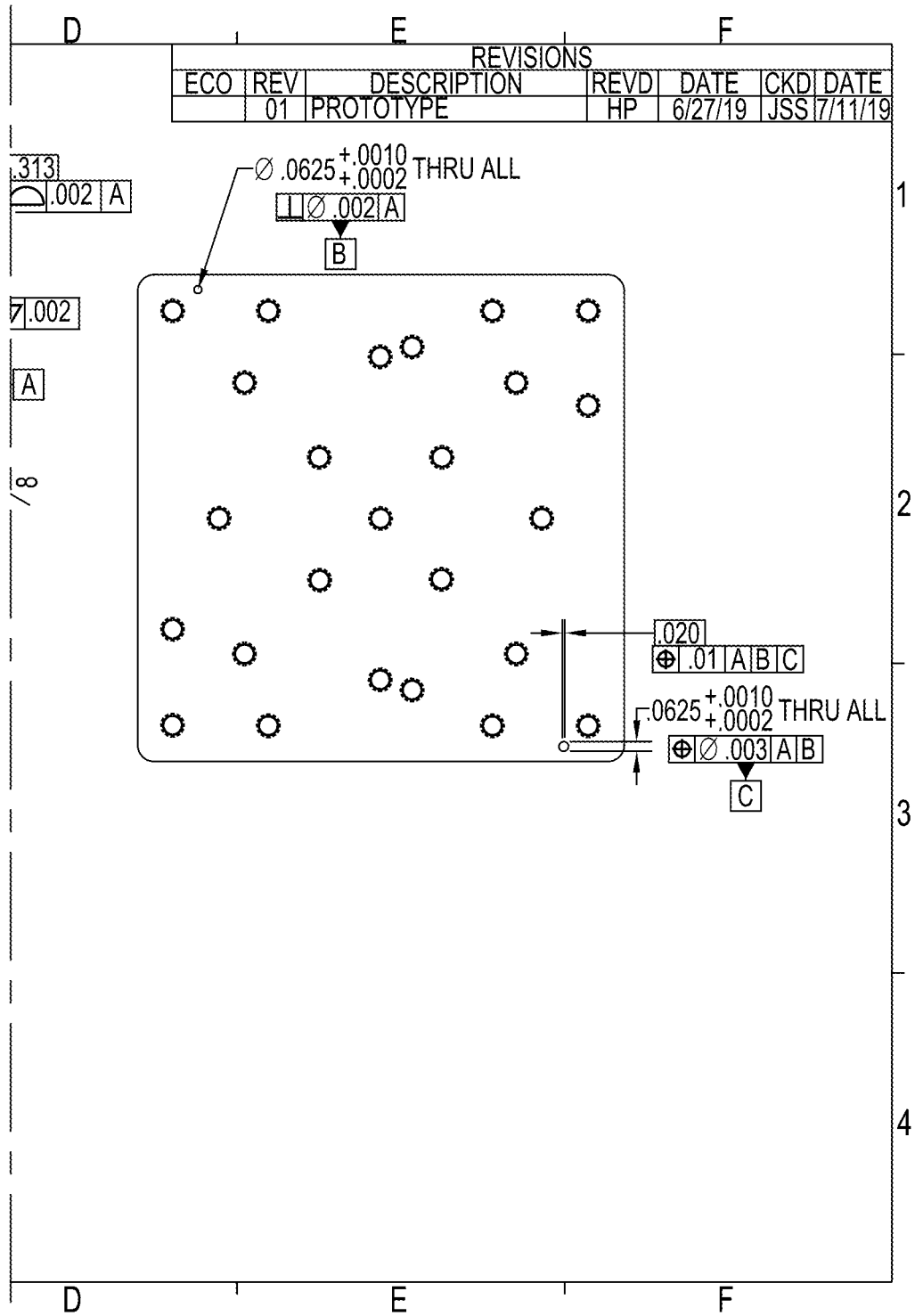
Figure 20:
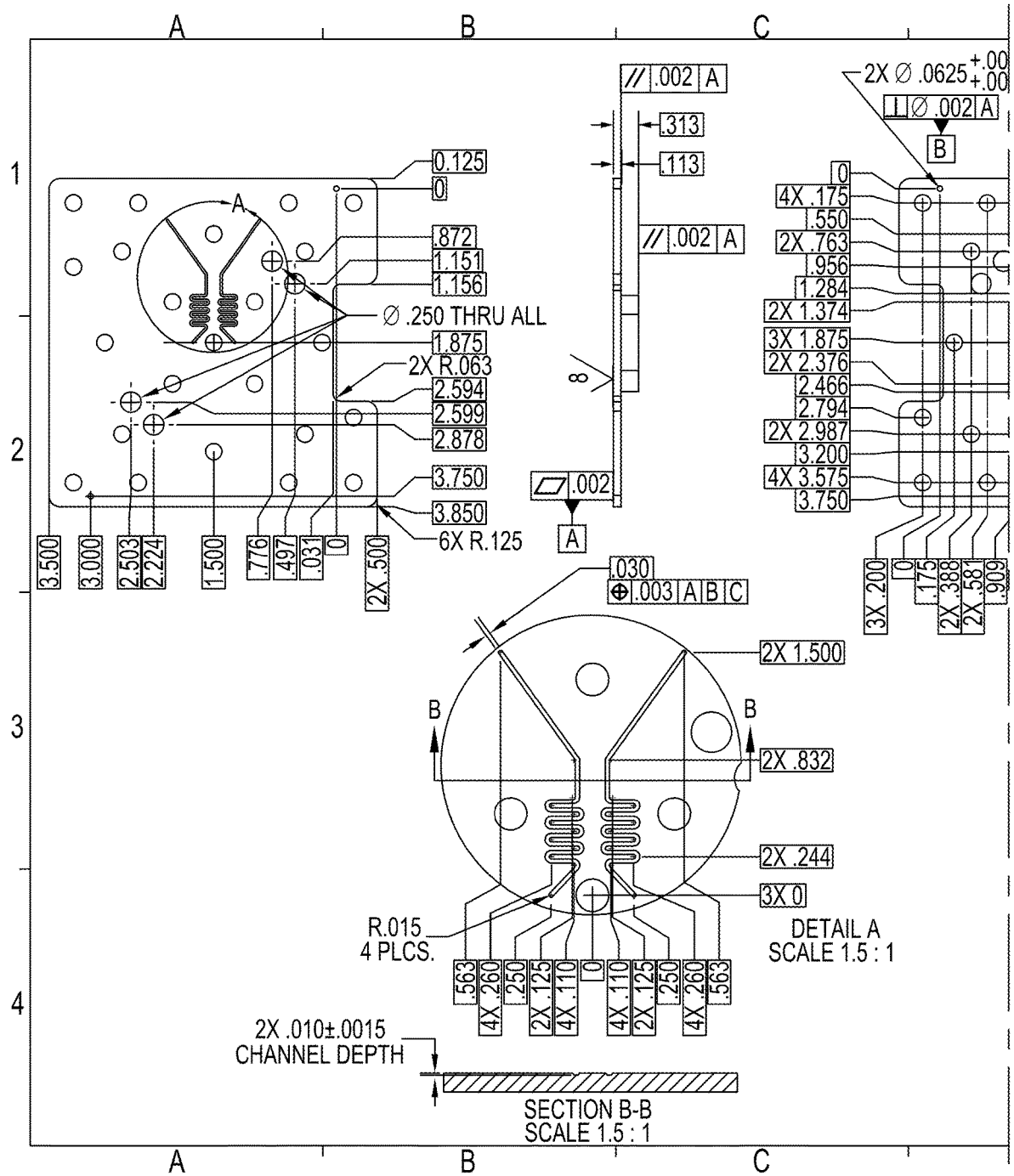
FIG. 20 shows a front view and a back view of a transfer plate, according to one implementation.
Figure 20:
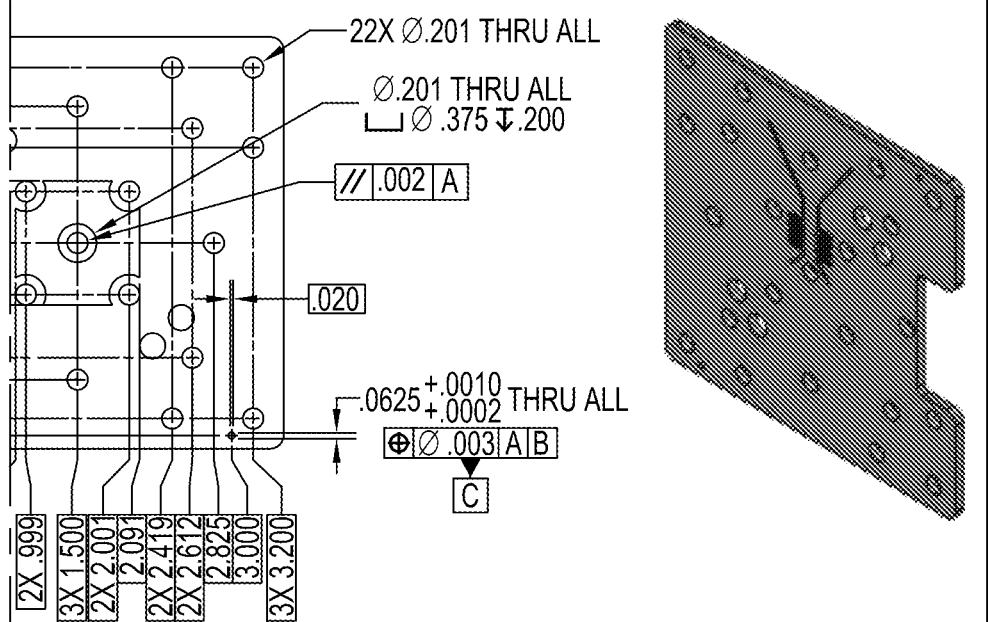

FIG. 19 shows a front view and back view of a clamp plate, and FIG. 20 shows a front and a back view of a transfer plate. The dimensions shown in FIGS. 19 and 20 are intended only as non-limiting examples.

Several example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising", and variations thereof as used herein, is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A device for measuring conductivity of a fluid at a desired temperature, the device comprising:
    a plurality of transfer modules, each transfer module comprising:
        a first transfer plate, the first transfer plate having a first side and a second side, wherein a first fluid channel is formed in the first side of the first transfer plate;
        a second transfer plate, the second transfer plate having a first side and a second side, wherein a second fluid channel is formed in the first side of the second transfer plate, wherein the first side of the first transfer plate faces the first side of the second transfer plate; and
        a gas permeable membrane disposed between the first transfer plate and the second transfer plate, wherein a portion of the first fluid channel and a portion of the second fluid channel are separated by the gas permeable membrane;
    one or more temperature measurement devices configured to measure a temperature of a fluid in at least one of the first fluid channel or the second fluid channel;
    a temperature control system configured to heat or cool the first transfer plate and the second transfer plate of each of the plurality of transfer modules, wherein heating or cooling the first transfer plate and the second transfer plate causes the fluid to be heated or cooled to the desired temperature;
    one or more conductivity sensors configured to measure i) a conductivity of the fluid within the portion of the first fluid channel separated from the second fluid channel by the gas permeable membrane at the desired temperature and/or ii) a conductivity of the fluid within the portion of the second fluid channel separated from the first fluid channel by the gas permeable membrane at the desired temperature; and
    a temperature-controlled enclosure, wherein the first transfer plate, the second transfer plate, and the gas permeable membrane of each of the plurality of transfer modules are at least partially within the temperature-controlled enclosure, the temperature-controlled enclosure comprising output and input ports for fluids to flow in and out of each transfer module,
    wherein the temperature-controlled enclosure comprises two shroud pieces that are attached along an interlocking lip enclosing the plurality of transfer modules and forming two end walls, a top wall, a bottom wall, wherein at least one of the end walls is insulated and wherein an insulating material is positioned between an inner side of the top wall and the plurality of transfer modules and between an inner side of the bottom wall and the plurality of transfer modules, said insulating material configured for insulation and sealing, wherein each of the plurality of transfer modules is at least partially held in place within the temperature-controlled enclosure by pressure exerted by the insulating material.

2. The device of claim 1, wherein, for each transfer module, the second side of the first transfer plate is attached to a first clamp plate and the second side of the second transfer plate is attached to a second clamp plate.

3. The device of claim 2, the temperature control system further configured to heat or cool at least one of the first clamp plate and the second clamp plate.

4. The device of claim 1, the temperature control system comprising one or more solid state heat pumps cooled by a heatsink.

5. The device of claim 1, wherein each transfer module further comprises:
   a first inlet at which fluid enters the first fluid channel; and
   a second inlet at which fluid enters the second fluid channel.

6. The device of claim 1, wherein the device is configured to operate as part of a total organic carbon (TOC) analyzer, wherein the TOC analyzer is configured to determine a TOC of a fluid sample in at least one of the first fluid channel or the second fluid channel based on: i) the conductivity of the fluid within the portion of the first fluid channel separated from the second fluid channel by the gas permeable membrane measured at the desired temperature and/or ii) the conductivity of the fluid within the portion of the second fluid channel separated from the first fluid channel by the gas permeable membrane measured at the desired temperature.

7. The device of claim 1, wherein one of the first fluid channel or the second fluid channel is configured to contain a fluid sample that has been oxidized and/or to which reagents have been added, each transfer module further comprising a third fluid channel configured for containing an unaltered portion of the fluid, wherein:
   the temperature control system is configured to changes the temperature of the unaltered portion of the fluid sample to the desired temperature, and
   the one or more conductivity sensors are configured to measure a conductivity of the unaltered portion of the fluid sample at the desired temperature.

8. The device of claim 1, wherein the gas permeable membrane is a $CO_2$ permeable membrane.

9. The device of claim 1, wherein at least one of the two shroud pieces includes a heat sink and a fan.

10. A method for determining conductivity of a fluid at a desired temperature, the method comprising:
   providing a plurality of transfer modules, each transfer module comprising:
      a first transfer plate, the first transfer plate having a first side and a second side, wherein a first fluid channel is formed in the first side of the first transfer plate;
      a second transfer plate, the second transfer plate having a first side and a second side, wherein a second fluid channel is formed in the first side of the second transfer plate, wherein the first side of the first transfer plate faces the first side of the second transfer plate; and
      a $CO_2$ permeable membrane disposed between the first transfer plate and the second transfer plate, wherein a portion of the first fluid channel and a portion of the second fluid channel are separated by the $CO_2$ permeable membrane;
   providing a temperature-controlled enclosure, wherein the first transfer plate, the second transfer plate, and the $CO_2$ permeable membrane of each of the plurality of transfer modules are at least partially within the temperature-controlled enclosure, the temperature-controlled enclosure comprising output and input ports for fluids to flow in and out of each transfer module,
   wherein the temperature-controlled enclosure comprises two shroud pieces that are attached along an interlocking lip enclosing the plurality of transfer modules and forming two end walls, a top wall, a bottom wall, wherein at least one of the end walls is insulated and wherein an insulating material is positioned between an inner side of the top wall and the plurality of transfer modules and between an inner side of the bottom wall and the plurality of transfer modules, said insulating material configured for insulation and sealing, wherein each of the plurality of transfer modules is at least partially held in place within the temperature-controlled enclosure by pressure exerted by the insulating material;
   measuring a temperature of the fluid within at least one of the first fluid channel or the second fluid channel of each transfer module using one or more temperature measurement devices;
   heating or cooling the fluid within the first fluid channel and the fluid within the second fluid channel of each transfer module to the desired temperature using a temperature control system, the temperature control system configured to heat or cool the first transfer plate and the second transfer plate of each transfer module to affect a temperature of the fluid within the first fluid channel and the fluid within the second fluid channel; and
   measuring i) a conductivity of the fluid within the portion of the first fluid channel separated from the second fluid channel by the $CO_2$ permeable membrane and/or ii) a conductivity of the fluid within the portion of the second fluid channel separated from the first fluid channel by the $CO_2$ permeable membrane using one or more conductivity sensors.

11. The method of claim 10, wherein, for each transfer module, the second side of the first transfer plate is attached to a first clamp plate and the second side of the second transfer plate is attached to a second clamp plate.

12. The method of claim 11, the temperature control system further configured to heat or cool at least one of the first clamp plate and the second clamp plate.

13. The method of claim 10, further comprising:
   determining a total organic compound (TOC) of the fluid based on: i) the conductivity of the fluid within the portion of the first fluid channel separated from the second fluid channel by the $CO_2$ permeable membrane measured at the desired temperature and/or ii) the conductivity of the fluid within the portion of the second fluid channel separated from the first fluid channel by the $CO_2$ permeable membrane measured at the desired temperature.

14. The method of claim 10, wherein one of the first fluid channel or the second fluid channel contains a fluid sample that has been oxidized and/or to which reagents have been added, each transfer module further comprising a third fluid channel containing an unaltered portion of the fluid, wherein:
   the temperature control system changes the temperature of the unaltered portion of the fluid sample to the desired temperature, and
   the one or more conductivity sensors measure a conductivity of the unaltered portion of the fluid sample at the desired temperature.

15. The method of claim 10, the temperature control system comprising one or more solid state heat pumps cooled by a heatsink.

16. The method of claim 10, wherein at least one of the two shroud pieces includes a heat sink and a fan.

17. A system for measuring conductivity of a fluid at a desired temperature, the system comprising:
- a plurality of transfer modules, each transfer module comprising:
  - a first transfer plate, the first transfer plate having a first side and a second side, wherein a first fluid channel is formed in the first side of the first transfer plate;
  - a second transfer plate, the second transfer plate having a first side and a second side, wherein a second fluid channel is formed in the first side of the second transfer plate, wherein the first side of the first transfer plate faces the first side of the second transfer plate; and
  - a gas permeable membrane disposed between the first transfer plate and the second transfer plate, wherein a portion of the first fluid channel and a portion of the second fluid channel are separated by the gas permeable membrane;
- one or more temperature measurement devices configured to measure a temperature of a fluid within the first fluid channel and/or a temperature of a fluid within the second fluid channel of each transfer module;
- a temperature control system configured to heat or cool the first transfer plate and the second transfer plate of each of the plurality of transfer modules, wherein heating or cooling the first transfer plate and the second transfer plate heats or cools the fluid within the first fluid channel and/or the fluid within the second fluid channel to the desired temperature;
- one or more conductivity sensors configured to measure a conductivity of the fluid within the portion of the first fluid channel separated from the second fluid channel by the gas permeable membrane and/or a conductivity of the fluid within the portion of the second fluid channel separated from the first fluid channel by the gas permeable membrane; and
- a temperature-controlled enclosure, wherein the first transfer plate, the second transfer plate, and the gas permeable membrane of each of the plurality of transfer modules are at least partially within the temperature-controlled enclosure, the temperature-controlled enclosure comprising output and input ports for fluids to flow in and out of each transfer module,
- wherein the temperature-controlled enclosure comprises two shroud pieces that are attached along an interlocking lip enclosing the plurality of transfer modules and forming two end walls, a top wall, a bottom wall, wherein at least one of the end walls is insulated and wherein an insulating material is positioned between an inner side of the top wall and the plurality of transfer modules and between an inner side of the bottom wall and the plurality of transfer modules, said insulating material configured for insulation and sealing, wherein each of the plurality of transfer modules is at least partially held in place within the temperature-controlled enclosure by pressure exerted by the insulating material.

18. The system of claim 17, wherein, for each transfer module, the second side of the first transfer plate is attached to a first clamp plate and the second side of the second transfer plate is attached to a second clamp plate.

19. The system of claim 18, the temperature control system further configured to heat or cool at least one of the first clamp plate and the second clamp plate.

20. The system of claim 17, the temperature control system comprising one or more solid state heat pumps cooled by a heatsink.

21. The system of claim 17, wherein the system is configured to operate as part of a total organic carbon (TOC) analyzer, wherein the TOC analyzer is configured to determine a TOC of a fluid sample in at least one of the first fluid channel or the second fluid channel based on: i) the conductivity of the fluid within the portion of the first fluid channel separated from the second fluid channel by the gas permeable membrane measured at the desired temperature and/or ii) the conductivity of the fluid within the portion of the second fluid channel separated from the first fluid channel by the gas permeable membrane measured at the desired temperature.

22. The system of claim 17, wherein the gas permeable membrane is a $CO_2$ permeable membrane.

23. The system of claim 17, wherein at least one of the two shroud pieces includes a heat sink and a fan.

* * * * *